United States Patent
Su et al.

(10) Patent No.: US 10,574,364 B2
(45) Date of Patent: Feb. 25, 2020

(54) QUANTUM SIGNAL DETECTION METHOD AND QUANTUM SIGNAL DETECTION APPARATUS

(71) Applicant: Huawei Technologies Co., Ltd., Shenzhen (CN)

(72) Inventors: Changzheng Su, Shenzhen (CN); Yang Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/139,307

(22) Filed: Sep. 24, 2018

(65) Prior Publication Data
US 2019/0028206 A1    Jan. 24, 2019

Related U.S. Application Data

(63) Continuation of application No. PCT/CN2017/072565, filed on Jan. 25, 2017.

(30) Foreign Application Priority Data
Mar. 25, 2016 (CN) .......................... 2016 1 0177076

(51) Int. Cl.
*H04B 10/63* (2013.01)
*H04L 9/08* (2006.01)
(Continued)

(52) U.S. Cl.
CPC ........... *H04B 10/63* (2013.01); *H04B 10/614* (2013.01); *H04B 10/6151* (2013.01);
(Continued)

(58) Field of Classification Search
CPC .. H04B 10/614; H04B 10/6151; H04B 10/63; H04B 10/70; H04L 9/0852; H04L 9/12
(Continued)

(56) References Cited

U.S. PATENT DOCUMENTS 10,153,848 B2 * 12/2018 Lucamarini ........ H04B 10/5161
2004/0109564 A1 * 6/2004 Cerf ...................... H04L 9/0858
380/256
(Continued)

FOREIGN PATENT DOCUMENTS

CN 102724036 A 10/2012
CN 102916807 A 2/2013
(Continued)

OTHER PUBLICATIONS

Fangjian, "Continuous-variable Quantum Key Distribution: Optical System Design and Improved Schemes," China Excellent Master's Thesis Full-text Database, Jun. 15, 2015, 2 pages.
(Continued)

Primary Examiner — Amritbir K Sandhu
(74) Attorney, Agent, or Firm — Slater Matsil, LLP

(57) ABSTRACT

Embodiments of this application disclose a quantum signal detection method and a quantum signal detection apparatus. The method includes: splitting a received optical pulse sequence into a first pulse sequence and a second pulse sequence that are in orthogonal polarization, where the signal pulses are quantum signal pulses; obtaining information about the reference pulses; generating local oscillator light; splitting the local oscillator light into first local oscillator light and second local oscillator light whose intensities are the same and that are in orthogonal polarization; performing homodyne detection on the first pulse sequence and the first local oscillator light, and performing homodyne detection on the second pulse sequence and the second local oscillator light, to obtain homodyne detection results; and obtaining regular components of the signal pulses in the optical pulse sequence according to the homodyne detection results and the information about the reference pulses.

14 Claims, 9 Drawing Sheets

(51) Int. Cl.
  *H04L 9/12* (2006.01)
  *H04B 10/61* (2013.01)
  *H04B 10/70* (2013.01)

(52) U.S. Cl.
  CPC .......... *H04B 10/70* (2013.01); *H04L 9/0852* (2013.01); *H04L 9/12* (2013.01)

(58) Field of Classification Search
  USPC .................................................. 398/202, 203
  See application file for complete search history.

(56) References Cited

U.S. PATENT DOCUMENTS

| | | | |
|---|---|---|---|
| 2006/0083376 A1 | 4/2006 | Kawamoto et al. | |
| 2006/0153573 A1* | 7/2006 | Tomaru | H04B 10/70 398/152 |
| 2006/0262930 A1* | 11/2006 | Dinu | H04L 9/0858 380/256 |
| 2006/0263096 A1* | 11/2006 | Dinu | H04L 9/0858 398/187 |
| 2006/0290941 A1* | 12/2006 | Kesler | H04B 10/70 356/491 |
| 2008/0267635 A1* | 10/2008 | Kawamoto | H04B 10/548 398/141 |
| 2009/0268901 A1* | 10/2009 | Lodewyck | H04L 9/0852 380/41 |
| 2010/0195831 A1 | 8/2010 | Tanaka et al. | |
| 2011/0032532 A1* | 2/2011 | Hirano | B82Y 10/00 356/491 |
| 2019/0028206 A1* | 1/2019 | Su | H04B 10/614 |
| 2019/0199523 A1* | 6/2019 | Alleaume | H04L 9/0852 |

FOREIGN PATENT DOCUMENTS

| | | |
|---|---|---|
| CN | 103780378 A | 5/2014 |
| CN | 104065475 A | 9/2014 |
| CN | 105024809 A | 11/2015 |

OTHER PUBLICATIONS

Jouguet, P. et al., "Experimental Demonstration of Long-Distance Continuous-Variable Quantum Key Distribution," Nature Photonics 7, 378-381 (2013), Submitted Oct. 23, 2012, 6 pages.

Qi, B. et al., "Generating the Local Oscillator 'Locally' in Continuous-Variable Quantum Key Distribution Based on Coherent Detection," Phys. Rev. X 5, 041009 vol. 5, Iss. 4, Oct. 21, 2015, 11 pages.

Soh, D.B.S. et al., "Self-Referenced Continuous-Variable Quantum Key Distribution Protocol," Phys. Rev. X 5, 041010, Oct. 21, 2015, 14 pages.

Huang, D. et al., "High-Speed Continuous-Variable Quantum Key Distribution without Sending a Local Oscillator," Optics Letters, vol. 40, No. 16, Aug. 15, 2015, pp. 3695-3698.

\* cited by examiner

QUANTUM SIGNAL DETECTION METHOD AND QUANTUM SIGNAL DETECTION APPARATUS

CROSS-REFERENCE TO RELATED APPLICATIONS

This application is a continuation of International Application No. PCT/CN2017/072565, filed on Jan. 25, 2017, which claims priority to Chinese Patent Application No. 201610177076.0, filed on Mar. 25, 2016. The disclosures of the aforementioned applications are hereby incorporated by reference in their entireties.

TECHNICAL FIELD

This application relates to the field of communications technologies, and in particular, to a quantum signal detection method and a quantum signal detection apparatus.

BACKGROUND

In a communication process encrypted by using a quantum key distribution (QKD) process. Usually, on a transmit end, a group of true random number sequences are first generated by using a physical process, and the group of true random number sequences are encoded onto a group of quantum states, and sent to a receive end through a quantum channel. On the receive end, the quantum states are randomly measured according to a protocol that is specified in advance, and then the receive end and the transmit end perform screening and negotiation by using a measurement base used in typical channel comparison, to generate a secure key, and finally encrypt to-be-sent plaintext by using the key for communication.

QKD includes a technological branch being continuous-variable quantum key distribution (CV-QKD). An existing quantum transmit end in CV-QKD is shown in FIG. 1, and the quantum end is configured to generate quantum light, and send the quantum light to a quantum receive end. The quantum light includes signal light. On the quantum transmit end, a random number to be sent to the quantum receive end is modulated by means of amplitude modulation and phase modulation onto regular components of the signal light.

The quantum light sent by the quantum transmitter further includes reference light whose light intensity is higher than a light intensity of the signal light. The reference light is used to help the quantum receive end detect a frequency offset and a phase difference between the signal light sent by the quantum transmitter and local oscillator light generated by the quantum receive end, to restore, in a digital signal processing (DSP) process of the quantum receiver, the random number sent by the quantum transmit end. The signal light and the reference light are pulse light whose periods are the same and time sequences are alternate. On the quantum receive end, homodyne detection needs to be performed on the signal light and the reference light and the local oscillator light. Therefore, polarization states of the signal light and the quantum light are the same and need to be the same as a polarization state of the local oscillator light.

The structure of the quantum receiver is shown in FIG. 1. The quantum receiver 10 includes a local oscillator light generator 11, a dynamic polarization controller 12, a 2:2 coupler 13, a balanced receiver 14, and a DSP 15.

The local oscillator light generator 11 is configured to generate the local oscillator light. The dynamic polarization controller 12 is configured to receive the quantum light sent by the quantum transmitter. Because the polarization state of the quantum light is changed during transmission of the quantum light, the polarization state of the quantum light received by the quantum receiver is indefinite. The dynamic polarization controller 12 needs to adjust polarization state of the quantum light, so that polarization state of the reference light and the signal light in the quantum light is the same as polarization state of the local oscillator light generated by the quantum receiver.

The local oscillator light generated by the local oscillator light generator 11 and the signal light emergent from the dynamic polarization controller 12 are incident to the 2:2 coupler 13 together. The 2:2 coupler 13 is configured to: evenly split the local oscillator light into first local oscillator light and second local oscillator light, and evenly split the signal light into a first pulse sequence and a second pulse sequence; and combine the first local oscillator light and the first pulse sequence into a first beam to be emergent, and combine the second local oscillator light and the second pulse sequence into a second beam to be emergent. The first beam and the second beam enter the balanced receiver 14, and balanced homodyne detection is performed on the first beam and the second beam, to detect the regular components of the signal light by means of the homodyne detection, so as to restore the random number to be sent by the quantum transmitter to the quantum receiver.

However, in the quantum receiver shown in FIG. 1, the dynamic polarization controller cannot rapidly perform adjustment during actual application, affecting use efficiency of the quantum receiver, and costs of the dynamic polarization controller are relatively high.

SUMMARY

Embodiments of this application provide a quantum signal detection method and a quantum signal detection apparatus.

According to a first aspect, an embodiment of this application provides a quantum signal detection method. The method includes splitting a received optical pulse sequence into a first pulse sequence and a second pulse sequence that are in orthogonal polarization, where the optical pulse sequence includes reference pulses and signal pulses whose time sequences are alternate and frequencies are the same, and the signal pulses are quantum signal pulses. The method also includes obtaining information about the reference pulses, where the information about the reference pulses includes regular components $X_r$ and $P_r$ of the reference pulses, and a phase difference between the reference pulses and the signal pulses in the optical pulse sequence. The method also includes generating local oscillator light, where the local oscillator light is a pulse sequence whose time sequence is coincident with a time sequence of the optical pulse sequence and whose frequency is the same as a frequency of the optical pulse sequence. The method also includes splitting the local oscillator light into first local oscillator light and second local oscillator light whose intensities are the same and that are in orthogonal polarization, where the first local oscillator light and the first pulse sequence are in a same polarization state, and the second local oscillator light and the second pulse sequence are in a same polarization state. The method also includes performing homodyne detection on the first pulse sequence and the first local oscillator light, and performing homodyne detection on the second pulse sequence and the second local oscillator light, to obtain homodyne detection results; and obtaining regular components of the signal pulses in the optical pulse sequence according to the homodyne detection results and the information about the reference pulses.

According to a second aspect, a quantum signal detection method is provided. The method includes splitting a received optical pulse sequence into a first pulse sequence and a second pulse sequence, where the first pulse sequence includes reference pulses and signal pulses whose time sequences are alternate and frequencies are the same, and the signal pulses are quantum signal pulses. The method also includes obtaining a first ratio, where the first ratio is a ratio of a light intensity of the first pulse sequence to a light intensity of the optical pulse sequence, where specifically, an optical power of the signal pulses in the first pulse sequence and an optical power of signal pulses in the optical pulse sequence may be detected by using a detector, and a ratio of the two optical powers is calculated, that is, the first ratio. The method also includes generating local oscillator light, where the local oscillator light is a pulse sequence whose time sequence is coincident with a time sequence of the optical pulse sequence. The method also includes splitting the local oscillator light into first local oscillator light and second local oscillator light, where the first local oscillator light and the first pulse sequence are in a same polarization state. The method also includes performing homodyne detection on the first pulse sequence and the local oscillator light, to obtain a homodyne detection result, where specifically, the first pulse sequence and the local oscillator light are input to a photoelectric detector, to output a differential frequency electrical signal of the two beams of light, that is, the homodyne detection result. The method also includes obtaining regular components of the signal pulses in the optical pulse sequence according to the homodyne detection result and the first ratio.

According to a third aspect, a quantum signal detection apparatus is provided. The apparatus includes a first optical splitter, configured to split a received optical pulse sequence into a first pulse sequence and a second pulse sequence that are in orthogonal polarization, where the optical pulse sequence includes reference pulses and signal pulses whose time sequences are alternate and frequencies are the same. For example, the first optical splitting module is a polarization beam splitter. The apparatus also includes an identifier, configured to obtain information about the reference pulses. The apparatus also includes a generator, configured to generate local oscillator light, where the local oscillator light is a pulse sequence whose time sequence is coincident with a time sequence of the optical pulse sequence, where for example, the generation module includes a laser source, a pulse modulator, a phase modulator, a first controller, and a second controller, where continuous light output by the laser source is modulated by the pulse modulator and then pulse light is output, and after the pulse light is further modulated by the phase modulator, pulse light with phase information is output, that is, the local oscillator light. In reference pulses period, the first controller is configured to control the pulse modulator to output a pulse whose light intensity is relatively low, and the second controller is configured to modulate a fixed phase (for example, 0 or $\pi/2$). In signal pulses period, the controller is configured to control the pulse modulator to output a pulse whose light intensity is relatively high, and the second controller is configured to: select a measurement base, and modulate a phase of the pulse according to the selected measurement base. The apparatus also includes a second optical splitter, configured to split the local oscillator light into first local oscillator light and second local oscillator light whose intensities are the same and that are in orthogonal polarization, where the first local oscillator light and the first pulse sequence are in a same polarization state, and the second local oscillator light and the second pulse sequence are in a same polarization state. For example, the second optical splitting module is a 50:50 optical splitter. The apparatus also includes a detector, configured to: perform homodyne detection on the first pulse sequence and the first local oscillator light, and perform homodyne detection on the second pulse sequence and the second local oscillator light, to obtain homodyne detection results. The apparatus also includes a processor, configured to obtain regular components of the signal pulses in the optical pulse sequence according to the homodyne detection results and the information about the reference pulses.

According to a fourth aspect, a quantum signal detection apparatus is provided. The apparatus includes a first optical splitter, configured to split a received optical pulse sequence into a first pulse sequence and a second pulse sequence, where the first pulse sequence includes reference pulses and signal pulses whose time sequences are alternate and frequencies are the same, and the signal pulses are quantum signal pulses. The apparatus also includes an identifier, configured to detect a first ratio, where the first ratio is a ratio of a light intensity of the first pulse sequence to a light intensity of the optical pulse sequence. For example, the obtaining module includes a detector, configured to: detect a light intensity of the signal pulses in the first pulse sequence and a light intensity of signal pulses in the optical pulse sequence, and calculate a ratio of the two light intensities, that is, the first ratio. The apparatus also includes a generator, configured to generate local oscillator light, where the local oscillator light is a pulse sequence whose time sequence is coincident with a time sequence of the optical pulse sequence. The apparatus also includes a second optical splitter, configured to split the local oscillator light into first local oscillator light and second local oscillator light, where the first local oscillator light and the first pulse sequence are in a same polarization state. The apparatus also includes a first detector, configured to perform homodyne detection on the first pulse sequence and the local oscillator light, to obtain a homodyne detection result. The apparatus also includes a processor, configured to obtain regular components of the signal pulses in the optical pulse sequence according to the homodyne detection result and the first ratio.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The following describes the technical solutions in the embodiments of this application with reference to the accompanying drawings in the embodiments of this application.

Figure 1:
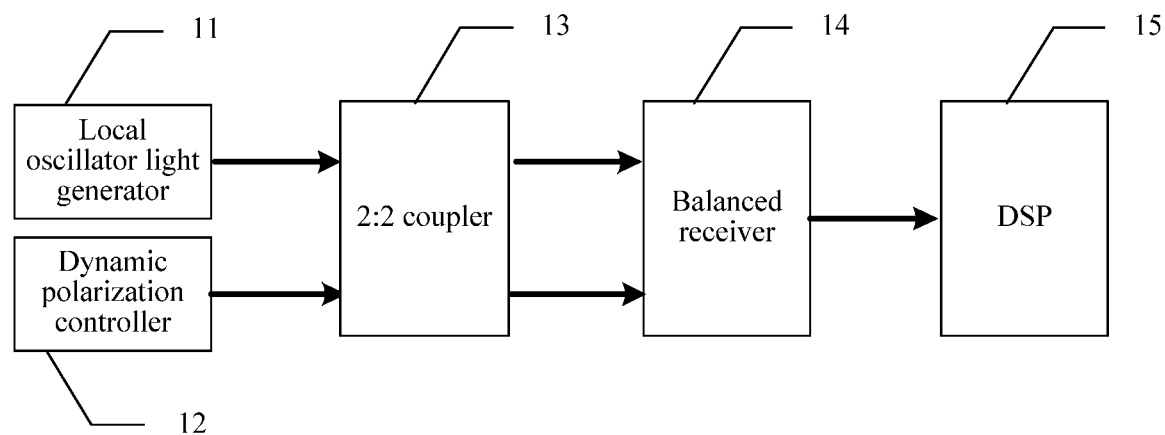
FIG. 1 is a schematic structural diagram of a quantum receiver.
Figure 2:
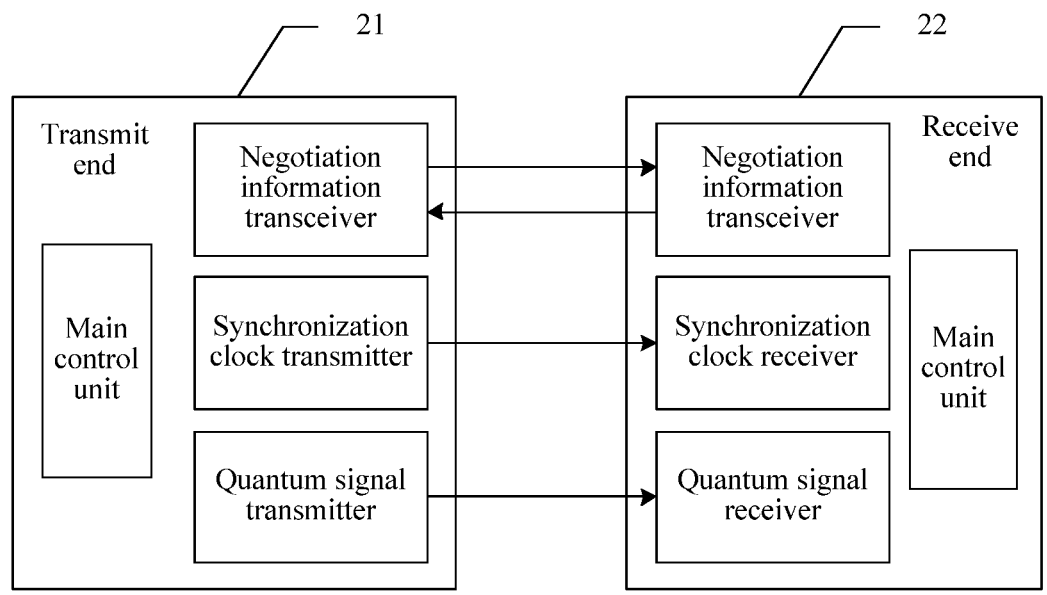
FIG. 2 is a schematic structural diagram of an embodiment of a communications system according to embodiments of this application.

For ease of understanding of the embodiments of this application, a communications system that is to be introduced in descriptions of the embodiments of this application is first described herein. As shown in FIG. 2, FIG. 2 is a schematic structural diagram of an embodiment of a communications system according to embodiments of this application. The communications system includes a transmit end 21 and a receive end 22. The transmit end 21 includes a main control unit, a negotiation information transceiver, a synchronization clock transmitter, and a quantum signal transmitter. The negotiation information transceiver, the synchronization clock transmitter, and the quantum signal transmitter work cooperatively under control of the main control unit. The receive end 22 includes a main control unit, a negotiation information transceiver, a synchronization clock receiver, and a quantum signal receiver. The negotiation information transceiver, the synchronization clock transmitter, and the quantum signal transmitter work cooperatively under control of the main control unit.

In this embodiment, before the transmit end 21 sends information to the receive end 22, to ensure communication security, the transmit end 21 first generates a group of random number sequences, encodes the group of random number sequences onto a group of quantum states, and sends the group of random number sequences to the receive end 22 through a quantum channel. The transmit end 21 further encrypts, by using the group of random number sequences, the information to be sent to the receive end 22, generates encrypted information, and then sends the encrypted information to the receive end 22.

The receive end 22 measures the group of quantum states, to obtain the random number sequences, and decrypts the encrypted information by using the group of random number sequences after receiving the encrypted information sent by the transmit end 21, to restore original information.

The quantum signal transmitter on the transmit end 21 is specifically configured to encode the random number sequences onto the group of quantum states. Specifically, the quantum signal transmitter sequentially modulates random numbers in the random number sequence onto different laser pulses, and sends the laser pulses to the receive end 22. For each random number, the quantum signal transmitter modulates the random number onto two regular components of a laser pulse respectively by means of amplitude modulation and phase modulation. Specifically, a laser is a coherent state $|\alpha\rangle$, where $\alpha=X+iP$ and is a complex number. Regular components of a laser pulse are a real part X and an imaginary part P of a corresponding complex number.

For ease of description, a laser pulse obtained after modulation is referred to as signal pulses below, and as can be learned according to the foregoing descriptions, the signal pulses are quantum signal pulses. The quantum signal receiver on the receive end 22 is configured to: receive the signal pulses, and obtain, by detecting X and/or P of the signal pulses, a random number to be sent by the transmit end 21. Specifically, after the quantum signal receiver on the receive end 22 receives the signal pulses, the negotiation information transceiver on the transmit end and the negotiation information transceiver on the receive end negotiate whether the random number to be sent by the transmit end 21 is obtained by X, P, or X and P of the signal pulses. Specifically, how to negotiate is the prior art, and details are not described herein again.

To perform stable interference on the signal pulses and local oscillator light on the receive end 22, an optical pulse sequence sent by the quantum signal transmitter to the quantum signal receiver further includes reference pulse sequence. A phase difference between each reference pulse in the reference pulse sequence and the signal pulses is a preset phase difference, and time sequences of the signal pulses and the reference pulses are alternate and polarization state of the signal pulses is the same as one of the reference pulses. For ease of description, reference pulses in the optical pulse sequence is referred to as reference light for short, and signal pulses in the optical pulse sequence is referred to as signal light for short.

The quantum signal transmitter sends the optical pulse sequence to the receive end 22. The synchronization clock transmitter on the transmit end 21 further sends clock information to the synchronization clock receiver on the receive end 22, so that the receive end 22 can generate local oscillator light synchronized with the optical pulse sequence. Specifically, how to send the clock information is the prior art, and details are not described herein again.

How the quantum signal receiver on the receive end 22 detects regular components of the signal light in the optical pulse sequence is specifically explained below.

For ease of understanding of this application, the principle of homodyne detection mentioned in this application is briefly described below. A signal (whose frequency is $w_s$) including measured information and a local oscillator beam (whose frequency is $w_L$) used as a basis are coherent light whose planes are parallel to each other. Frequency mixing is performed on the two beams of light on a photoelectric detector, to form a coherent light field. After the photoelectric detector performs conversion, an output electrical signal includes a differential frequency signal whose frequency is $w_s-w_L$. In a special form of heterodyne detection, $w_L=w_s$, that is, a frequency of signal light is the same as a frequency of local oscillator light, and the special form is referred to as homodyne detection.

Figure 3:
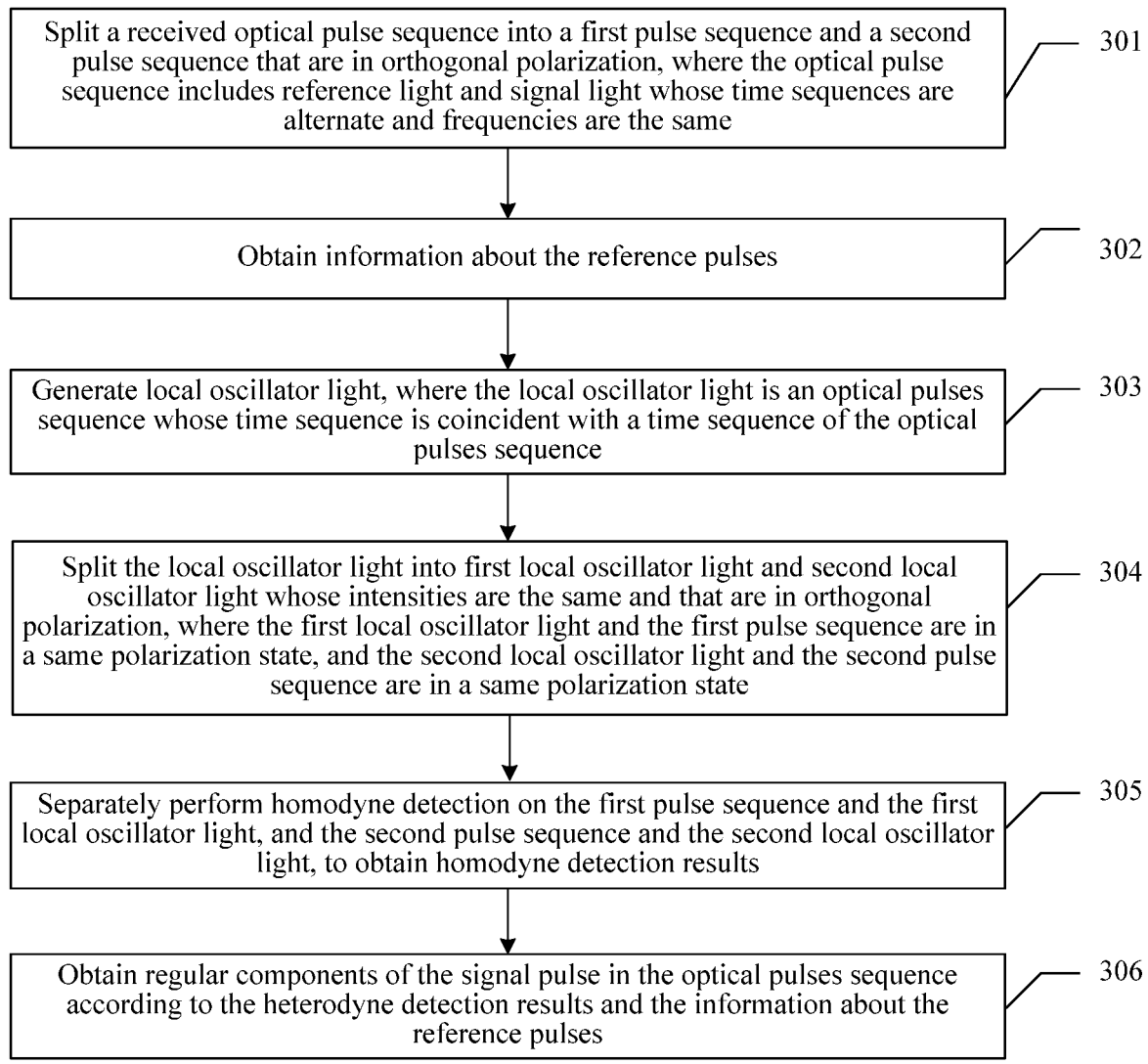
FIG. 3 is a schematic flowchart of an embodiment of a method for detecting a received optical pulse sequence by a quantum signal receiver in the communications system shown in FIG. 2.

FIG. 3 is a schematic flowchart of an embodiment of a method for detecting a received optical pulse sequence by the quantum signal receiver in the communications system shown in FIG. 2. A quantum signal detection method in this embodiment includes the following steps.

301: Split a received optical pulse sequence into a first pulse sequence and a second pulse sequence that are in orthogonal polarization, where the optical pulse sequence includes reference light and signal light whose time sequences are alternate and frequencies are the same.

Polarization state of reference light and signal light in an optical pulse sequence sent by the transmit end is the same. However, during transmission, because polarization states of the reference light and the signal light are changed together, the polarization states of the reference light and the signal light in the optical pulse sequence received by the quantum signal receiver are unknown. In this embodiment, homodyne detection needs to be performed on the optical pulse sequence received by the quantum signal receiver and local oscillator light generated by the quantum signal receiver, that is, the reference light and the signal light in the optical pulse sequence separately need to satisfy a coherent condition with the local oscillator light. Therefore, the reference light, the signal light, and the local oscillator light all need to be in a same polarization state.

In this embodiment, the quantum signal receiver splits, according to a first preset angle, the received optical pulse sequence into the first pulse sequence and the second pulse sequence that are in orthogonal polarization. In this way, polarization directions of reference light and signal light that are in the first pulse sequence and whose time sequences are alternate are definite, and polarization directions of reference light and signal light that are in the second pulse sequence and whose time sequences are alternate are definite. There are a plurality of splitting methods. For example, the quantum signal receiver includes a polarization beam splitter, and the optical pulse sequence is split by the polarization beam splitter into two beams of light that are in orthogonal polarization.

For ease of description, a light field of the optical pulse sequence in signal pulses period is represented by $a_s$, and a light field of the optical pulse sequence in reference pulses period is represented by $a_r$ below, where $a_s=X_s+iP_s$, and $a_r=X_r+iP_r$.

Therefore, in the signal pulses period, a light field of the first pulse sequence is $\sqrt{m}a_s$, and a light field of the second pulse sequence is $\sqrt{n}a_s$; and in the reference pulses period, a light field of the first pulse sequence is $\sqrt{m}a_r$, and a light field of the second pulse sequence is $\sqrt{n}a_r$, where $m^2+n^2=1$, and m and n are nonnegative numbers.

302: Obtain information about the reference pulses.

In this embodiment, the information about the reference pulses includes regular components $X_r$ and $P_r$ of the reference pulses, and a phase difference between the reference pulses and the signal pulses in the optical pulse sequence.

There are a plurality of methods for the quantum signal receiver to obtain the information about the reference pulses. For example, because the information about the reference pulses is typical information, when sending the optical pulse sequence through the quantum channel, the quantum signal transmitter further sends the information about the reference pulses to the quantum signal receiver through a typical optical channel; and the quantum signal receiver receives the information about the reference pulses on the typical optical channel; or, after sending the optical pulse sequence through the quantum channel, the quantum signal transmitter further sends the information about the reference pulses to the quantum signal receiver through the quantum channel; and the quantum signal receiver receives the information about the reference pulses on the quantum channel; or, the negotiation information transceiver on the transmit end and the negotiation information transceiver on the receive end specify the information about the reference pulses in advance, and the quantum signal receiver obtains the information about the reference pulses from the negotiation information transceiver on the receive end.

303: Generate local oscillator light, where the local oscillator light is an optical pulse sequence whose time sequence is coincident with a time sequence of the optical pulse sequence.

In this embodiment, homodyne detection is performed on the local oscillator light and the reference light and the signal light in the optical pulse sequence received by the quantum signal receiver. Therefore, the time sequence of the local oscillator light generated by the quantum signal receiver is coincident with the time sequence of the optical pulse sequence, and a frequency of the local oscillator light is the same as the frequencies of the signal light and the reference light. However, during actual application, the frequencies of the local oscillator light, the signal light, and the reference light cannot be completely the same, but when differences between the frequencies of the three types of light are controlled within a particular range, an existing coherent optical communications technology may be used to perform calculation and compensation. Therefore, as described in this application, that the frequency of the local oscillator light is the same as the frequencies of the signal light and the reference light means that the difference between the frequencies of the three types of light is controlled within a preset range.

A specific method for generating the local oscillator light is described by using an example below.

The quantum signal receiver includes a local oscillation laser, a pulse shaping modulator, and a phase modulator. According to clock information received by the synchronization clock receiver on the receive end, continuous light output by the local oscillation laser is modulated by the pulse shaping modulator, and then pulse light whose time sequence is coincident with a time sequence of the optical pulse sequence is output. After the pulse light is further modulated by the phase modulator, pulse light with phase information is output. In the reference pulses period, the pulse shaping modulator is configured to output a pulse with a fixed phase (for example, 0 or $\pi/2$); and in the signal pulses period, the pulse shaping modulator is configured to: output, according to information negotiated by the negotiation information transceiver on the receive end, a pulse whose phase is selected from, for example, 0 and $\pi/2$. The selection from the two phases determines whether to detect X or P of the signal light.

For ease of description, a light field of the local oscillator light is represented by $a_L$ below, and $a_L=\sqrt{I_L}e^{i\theta}$ where $\theta$ is a phase difference between the signal light and the local oscillator light, and $I_L$ is a light intensity of the local oscillator light.

304: Split the local oscillator light into first local oscillator light and second local oscillator light whose intensities are the same and that are in orthogonal polarization, where the first local oscillator light and the first pulse sequence are in a same polarization state, and the second local oscillator light and the second pulse sequence are in a same polarization state.

Because homodyne detection needs to be separately performed on the local oscillator light and the reference light and the signal light in the first pulse sequence, and homodyne detection needs to be separately performed on the local oscillator light and the reference light and the signal light in the second pulse sequence, the local oscillator light is split, according to the first preset angle, into the first local oscillator light and the second local oscillator light whose intensities are the same and that are in orthogonal polarization. In this way, the first local oscillator light and the first pulse sequence are in the same polarization state, and the second local oscillator light and the second pulse sequence are in the same polarization state.

Specifically, light fields of the first local oscillator light and the second local oscillator light are both $$\frac{1}{\sqrt{2}} a_L.$$

305: Perform homodyne detection on the first pulse sequence and the first local oscillator light, and perform homodyne detection on the second pulse sequence and the second local oscillator light, to obtain homodyne detection results.

Figure 4:
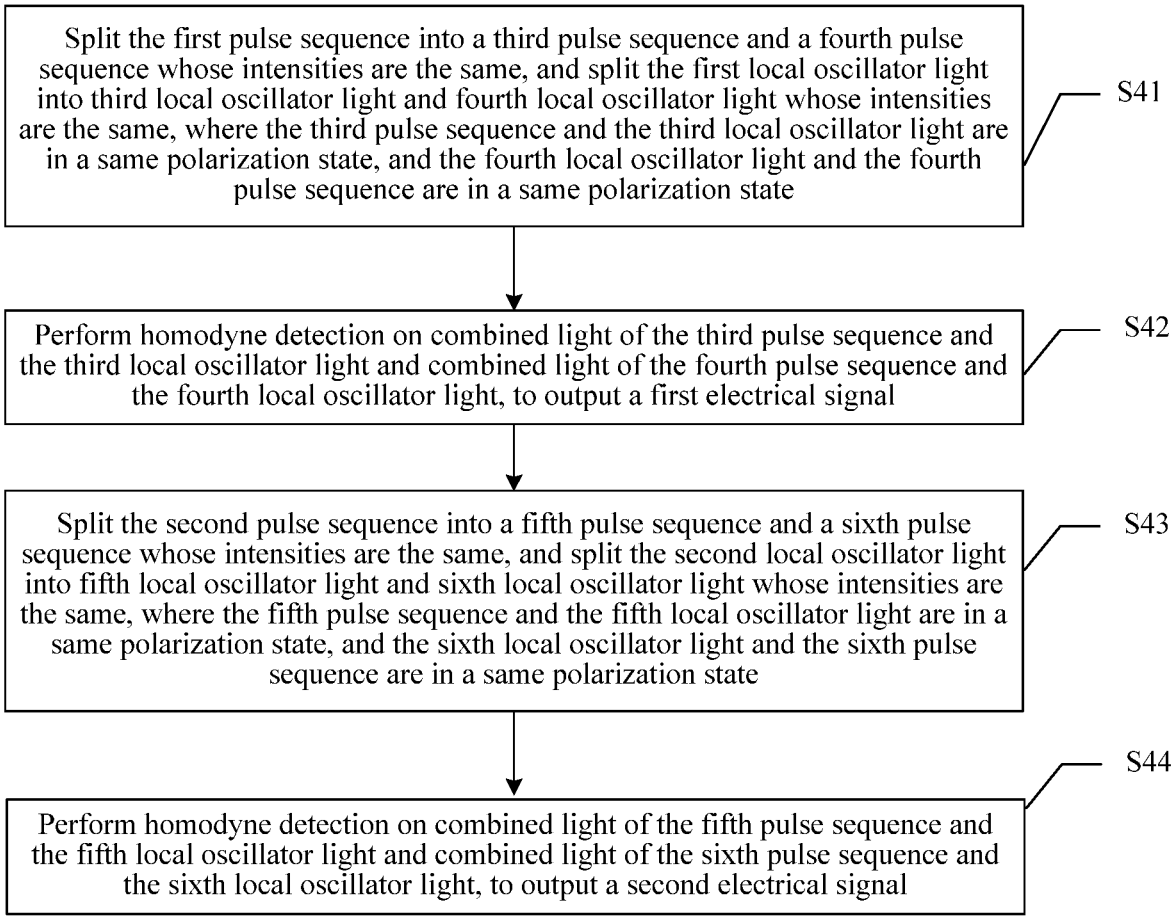
FIG. 4 is a schematic flowchart of an embodiment of separately performing homodyne detection on the first pulse sequence and the first local oscillator light, and the second pulse sequence and the second local oscillator light.

In this embodiment, there are a plurality of specific methods for separately performing homodyne detection on the first pulse sequence and the first local oscillator light, and the second pulse sequence and the second local oscillator light, and one method thereof is described by using an example below. Referring to FIG. 4, FIG. 4 is a schematic flowchart of an embodiment of separately performing homodyne detection on the first pulse sequence and the first local oscillator light, and the second pulse sequence and the second local oscillator light. As shown in FIG. 4, the separately performing homodyne detection on the first pulse sequence and the first local oscillator light, and the second pulse sequence and the second local oscillator light includes:

S41: Split the first pulse sequence into a third pulse sequence and a fourth pulse sequence whose intensities are the same, and split the first local oscillator light into third local oscillator light and fourth local oscillator light whose intensities are the same, where the third pulse sequence and the third local oscillator light are in a same polarization state, and the fourth local oscillator light and the fourth pulse sequence are in a same polarization state.

S42: Perform homodyne detection on combined light of the third pulse sequence and the third local oscillator light and combined light of the fourth pulse sequence and the fourth local oscillator light, to output a first electrical signal.

The reference light in the first pulse sequence is split into two columns of reference light whose intensities are the same, and the signal light in the first pulse sequence is split into two columns of reference light whose intensities are the same. The third pulse sequence includes reference light and signal light whose time sequences are alternate, and the fourth pulse sequence includes reference light and signal light whose time sequences are alternate.

Because the first pulse sequence and the first local oscillator light are in the same polarization state, the first pulse sequence and the first local oscillator light may be split or combined at the same time by using a same polarizer. Specifically, as shown in FIG. 5, FIG. 5 is a schematic diagram of the principle of separately performing homodyne detection on the first pulse sequence and the first local oscillator light, and the second pulse sequence and the second local oscillator light in the embodiment shown in FIG. 4.

Figure 5:
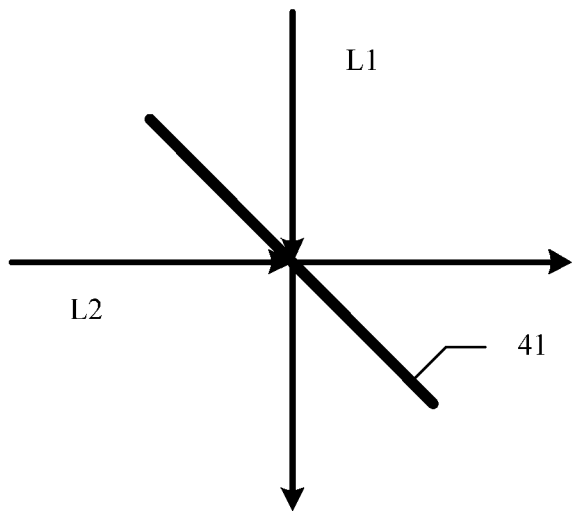
FIG. 5 is a schematic diagram of the principle of separately performing homodyne detection on the first pulse sequence and the first local oscillator light, and the second pulse sequence and the second local oscillator light in the embodiment shown in FIG. 4.

In FIG. 5, the first optical pulse sequence L1 and the first local oscillator light L2 are respectively incident to a same position on a polarizer 41 from two sides of the polarizer 41 at an angle of 45 degrees, one part of light of the first optical pulse sequence L1 is transmitted by the polarizer 41, to form the third pulse sequence, and the other part of the light is reflected by the polarizer 41, to form the fourth pulse sequence. One part of light of the first local oscillator light L2 is reflected by the polarizer 41, to form the third local oscillator light, and is combined with the third pulse sequence to form a first emergent beam; and the other part of the light is transmitted by the polarizer 41, to form the fourth local oscillator light, and is combined with the fourth pulse sequence to form a second emergent beam.

An included angle between a polarization direction of the polarizer 41 and a polarization direction of the first local oscillator light is 45 degrees, so that the light intensities of the first local oscillator light transmitted by the polarizer 41 and the first local oscillator light reflected by the polarizer are the same, and the light intensities of the first pulse sequence transmitted by the polarizer 41 and the first pulse sequence reflected by the polarizer 41 are the same.

Therefore, a light field of the third pulse sequence is $$\frac{1}{\sqrt{2}} \sqrt{m}\, a_s,$$

and a light field of the fourth pulse sequence is $$\frac{1}{\sqrt{2}} \sqrt{m} \times ia_s,$$

where an imaginary number i indicates that a phase difference between reflected light and transmitted light is π/2. Similarly, a light field of the third local oscillator light is $$\frac{1}{\sqrt{2}} \sqrt{m} \times ia_L,$$

and a light field or the fourth local oscillator light is $$\frac{1}{\sqrt{2}} \sqrt{m}\, a_L.$$

That is, a light field of the first emergent beam is $$\frac{1}{\sqrt{2}} \sqrt{m}\, a_s + \frac{1}{\sqrt{2}} \sqrt{m} \times ia_L = \frac{1}{\sqrt{2}} \sqrt{m}\, (a_s + ia_L),$$

and a light field of the second emergent beam is $$\frac{1}{\sqrt{2}} \sqrt{m} \times ia_s + \frac{1}{\sqrt{2}} \sqrt{m}\, a_L = \frac{1}{\sqrt{2}} \sqrt{m}\, (ia_s + a_L).$$

A photoelectric detector (not shown) is configured to receive the first emergent beam and the second emergent beam. In the signal pulses period, the photoelectric detector converts the first emergent beam to an electrical signal $I_1$, and converts the second emergent beam to an electrical signal $I_2$, where $$I_1 \propto \frac{1}{\sqrt{2}}\sqrt{m}(a_s^+ - ia_L^+) \times \frac{1}{\sqrt{2}}\sqrt{m}(a_s + ia_L); \text{ and}$$

$$= \frac{1}{2}m(a_s^+ a_s + a_L^+ a_L + ia_s^+ a_L - ia_L^+ a_s)$$

$$= \frac{1}{2}m\left[a_s^+ a_s + a_L^+ a_L + i(X_s - iP_s)\sqrt{I_L}\,e^{i\theta} - i\sqrt{I_L}\,e^{-i\theta}(X_s + iP_s)\right]$$

$$I_2 \propto \frac{1}{\sqrt{2}}\sqrt{m}(-ia_s^+ + a_L^+) \times \frac{1}{\sqrt{2}}\sqrt{m}(ia_s + a_L)$$

$$= \frac{1}{2}m(a_s^+ a_s + a_L^+ a_L - ia_s^+ a_L + ia_L^+ a_s)$$

$$= \frac{1}{2}m\left[a_s^+ a_s + a_L^+ a_L - i(X_s - iP_s)\sqrt{I_L}\,e^{i\theta} + i\sqrt{I_L}\,e^{-i\theta}(X_s + iP_s)\right].$$

Therefore, in the signal pulses period, the first electrical signal is a differential frequency signal $I_{1s}$ of the electrical signal $I_1$ and the electrical signal $I_2$ that are output by the photoelectric detector, where $$I_{1s} = I_1 - I_2 \propto im\sqrt{I_L}\,[(X_s - iP_s)e^{i\theta} - (X_s + iP_s)e^{-i\theta}]$$

$$= im\sqrt{I_L}\,[X_s(e^{i\theta} - e^{-i\theta}) - iP_s(e^{i\theta} + e^{-i\theta})]$$

$$= im\sqrt{I_L}\,[2i(X_s\sin\theta - P_s\cos\theta)]$$

$$= 2m\sqrt{I_L}\,(P_s\cos\theta - X_s\sin\theta).$$

Similarly, in the reference pulses period, the first electrical signal is a differential frequency signal $I_{1r}$ output by the photoelectric detector 42, where $I_{1r} \propto 2\sqrt{I_L}(P_r\cos\varphi - X_r\sin\varphi)$.

S43: Split the second pulse sequence into a fifth pulse sequence and a sixth pulse sequence whose intensities are the same, and split the second local oscillator light into fifth local oscillator light and sixth local oscillator light whose intensities are the same, where the fifth pulse sequence and the fifth local oscillator light are in a same polarization state, and the sixth local oscillator light and the sixth pulse sequence are in a same polarization state.

S44: Perform homodyne detection on combined light of the fifth pulse sequence and the fifth local oscillator light and combined light of the sixth pulse sequence and the sixth local oscillator light, to output a second electrical signal.

The reference light in the second pulse sequence is split into two columns of reference light whose intensities are the same, and the signal light in the second pulse sequence is split into two columns of reference light whose intensities are the same. The fifth optical pulse sequence includes reference light and signal light whose time sequences are alternate, and the sixth optical pulse sequence includes reference light and signal light whose time sequences are alternate.

In this embodiment, processes of processing the second pulse sequence and the second local oscillator light are the same as processes of processing the first pulse sequence and the first local oscillator light. For details, refer to explanations and descriptions below step S42, and details are not described herein again. As can be learned according to the explanations and descriptions below step S42, in the signal pulses period, the second electrical signal is $I_2$; and in the reference pulses period, the second electrical signal is $I_{2r}$, where $I_{2s} \propto 2m\sqrt{I_L}(P_s\cos\theta - X_s\sin\theta)$, and $I_2 \propto 2\sqrt{I_L}(P_r\cos\varphi - X_r\sin\varphi)$.

Therefore, in this embodiment, the homodyne detection results obtained by separately performing homodyne detection on the first pulse sequence and the first local oscillator light, and the second pulse sequence and the second local oscillator light include the first electrical signal and the second electrical signal.

306: Obtain regular components of the signal pulses in the optical pulse sequence according to the homodyne detection results and the information about the reference pulses.

Figure 6:
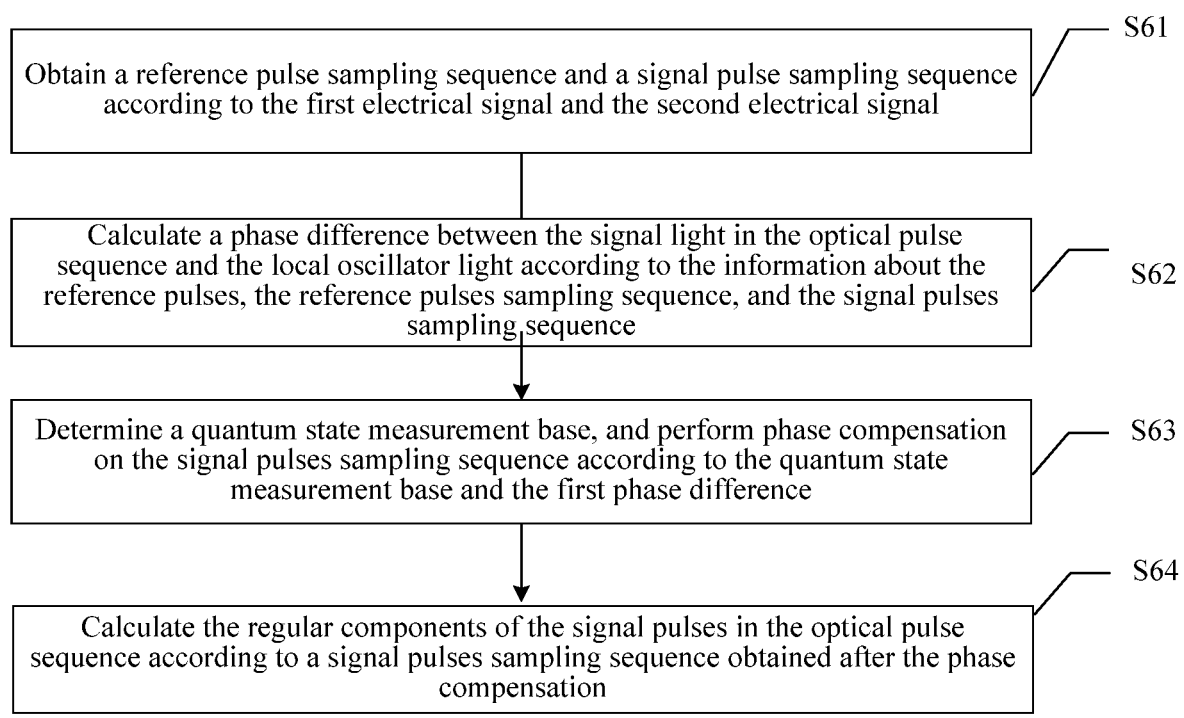
FIG. 6 is a schematic diagram of an embodiment of a method for obtaining regular components of the signal pulses in the optical pulse sequence.

In this embodiment, there are a plurality of methods for calculating the regular components of the signal pulses according to the homodyne detection results and the information about the reference pulses, and one calculation method thereof for the first electrical signal and the second electrical signal in the embodiment shown in FIG. 4 is described by using an example below with reference to the homodyne detection results. Referring to FIG. 6, FIG. 6 is a schematic diagram of an embodiment of a method for obtaining the regular components of the signal pulses in the optical pulse sequence. The method includes:

S61: Obtain a reference pulses sampling sequence and a signal pulses sampling sequence according to the first electrical signal and the second electrical signal.

Sampling and integration are performed on the first electrical signal and the second electrical signal, to obtain a third electrical signal, where the third electrical signal includes the reference pulses sampling sequence and the signal pulses sampling sequence whose time sequences are alternate.

In the signal pulses period, the third electrical signal $I_3 = \sqrt{I_{1s}^2 + I_{2s}^2} \propto \sqrt{I_L}(P_s\cos\theta - X_s\sin\theta)$.

In the reference pulses period, the third electrical signal $I_3 = \sqrt{I_{1r}^2 + I_{2r}^2} \propto \sqrt{I_L}(P_r\cos\varphi - X_r\sin\varphi)$.

As can be learned, the electrical signal obtained after the integration is irrelevant to a ratio of intensities of beams obtained after the optical pulse sequence is polarized and split.

S62: Calculate a phase difference between the signal light in the optical pulse sequence and the local oscillator light according to the information about the reference pulses, the reference pulses sampling sequence, and the signal pulses sampling sequence.

For ease of description, the phase difference between the signal light in the optical pulse sequence and the local oscillator light is referred to as a first phase difference below.

The information about the reference pulses includes $X_r$ and $P_r$ of the reference light, and a phase difference between the reference light and the local oscillator light. Because $X_r$ and $P_r$ of the reference light are known, and $I_L$ is known, the second phase difference $\varphi$ may be calculated according to the detected $I_3$, $I_L$, $X_r$, and $P_r$. Because the phase difference between the reference light and the local oscillator light is known, the first phase difference $\theta$ may be calculated according to the phase difference between the reference light and the local oscillator light and $\varphi$.

S63: Determine a quantum state measurement base, and perform phase compensation on the signal pulses sampling sequence according to the quantum state measurement base and the first phase difference.

S64: Calculate the regular components of the signal pulses in the optical pulse sequence according to a signal pulses sampling sequence obtained after the phase compensation.

In this embodiment, the quantum state measurement base is used to instruct to choose to measure whether $X_s$ or $P_s$ of the signal light. After the phase difference θ between the signal light and the local oscillator light is obtained, a phase of the local oscillator light is adjusted, so that the phase of the local oscillator light is decreased by θ. In this way, the phase of the local oscillator light is the same as a phase of the signal light. In addition, after the quantum state measurement base is determined, if the quantum state measurement base instructs to measure $X_s$ of the signal light, the phase of the local oscillator light is further decreased by π/2, that is, a phase difference obtained after the phase adjustment between the local oscillator light and the signal light is π/2. In this way, in the finally output third electrical signal, $P_s \cos\theta - X_s \sin\theta = X_s$, that is, the third electrical signal $I_3 \propto \sqrt{I_L} X_s$. If the quantum state measurement base instructs to measure $P_s$ of the signal light, the phase of the local oscillator light is further increased by 0 degrees. In this way, in the finally output third electrical signal, $P_s \cos\theta - X_s \sin\theta = P_s$, that is, the third electrical signal $I_3 \propto \sqrt{I_L} P_s$. In this way, the regular components of the signal light can be calculated according to the measured $I_3$ and various known parameters.

In the embodiments, the received optical pulse sequence is split into the first and the second pulse sequences that are in orthogonal polarization; and the generated local oscillator light is split into the first and the second local oscillator light that are in orthogonal polarization, where the first pulse sequence and the first local oscillator light are in the same polarization state, and the second pulse sequence and the second local oscillator light are in a same polarization state. In this way, homodyne detection can be performed on the optical pulse sequence and the local oscillator light without using a dynamic polarization controller, so that the method is simple and costs are relatively low. In addition, in the embodiments, homodyne detection is separately performed on the first pulse sequence and the first local oscillator light, and the second pulse sequence and the second local oscillator light, and in a process of performing processing by using the homodyne detection results, a ratio of each of the first and the second pulse sequences to the optical pulse sequence can be canceled, so that the processing result is independent of the ratio of each of the first and the second pulse sequences to the optical pulse sequence.

Figure 7:
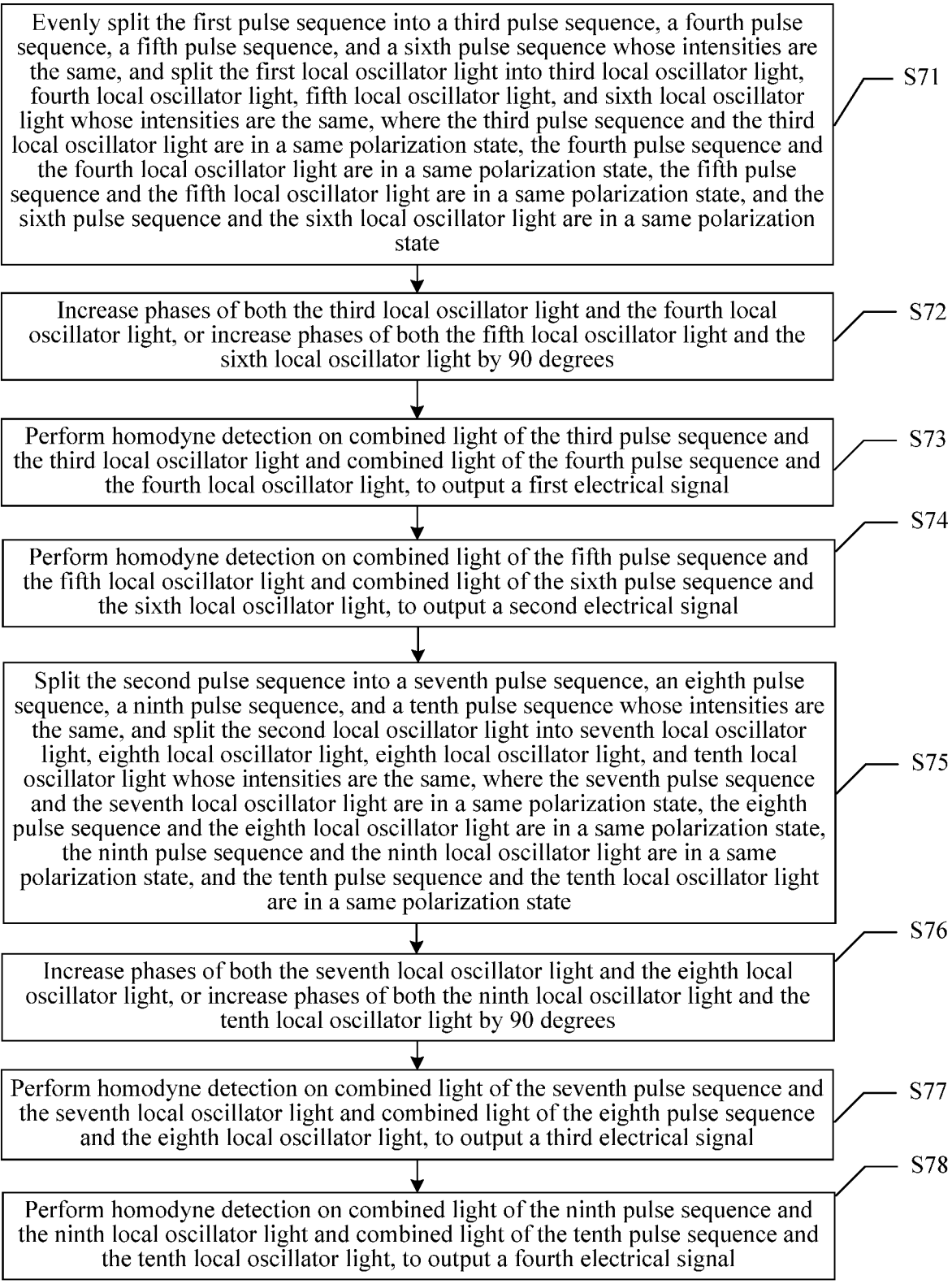
FIG. 7 is a schematic flowchart of another embodiment of separately performing homodyne detection on the first pulse sequence and the first local oscillator light, and the second pulse sequence and the second local oscillator light.

In step 305 in the foregoing embodiment, a method for separately performing homodyne detection on the first pulse sequence and the first local oscillator light, and the second pulse sequence and the second local oscillator light is described with reference to FIG. 4. Another method for separately performing homodyne detection on the first pulse sequence and the first local oscillator light, and the second pulse sequence and the second local oscillator light is described by using an example below. As shown in FIG. 7, FIG. 7 is a schematic flowchart of another embodiment of separately performing homodyne detection on the first pulse sequence and the first local oscillator light, and the second pulse sequence and the second local oscillator light.

S71: Evenly split the first pulse sequence into a third pulse sequence, a fourth pulse sequence, a fifth pulse sequence, and a sixth pulse sequence whose intensities are the same, and split the first local oscillator light into third local oscillator light, fourth local oscillator light, fifth local oscillator light, and sixth local oscillator light whose intensities are the same, where the third pulse sequence and the third local oscillator light are in a same polarization state, the fourth pulse sequence and the fourth local oscillator light are in a same polarization state, the fifth pulse sequence and the fifth local oscillator light are in a same polarization state, and the sixth pulse sequence and the sixth local oscillator light are in a same polarization state.

Each of the third pulse sequence, the fourth pulse sequence, the fifth optical pulse sequence, and the sixth pulse sequence includes reference light and signal light whose time sequences are alternate.

In the signal pulses period, light fields of the third pulse sequence and the fifth pulse sequence are both $$\frac{1}{2}\sqrt{m}\, a_s;$$

and light fields of the fourth pulse sequence and the sixth pulse sequence are both $$\frac{1}{2}\sqrt{m} \times ia_s.$$

In the reference pulses period, light fields of the third pulse sequence and the fifth pulse sequence are both $$\frac{1}{2}\sqrt{m} \times ia_r;$$

and light fields of the fourth pulse sequence and the sixth pulse sequence are both $$\frac{1}{2}\sqrt{m}\, a_r.$$

Light fields of the third local oscillator light and the fifth local oscillator light are both $$\frac{1}{2}\sqrt{m} \times ia_L;$$

and light rims of the fourth local oscillator light and the sixth local oscillator light are both $$\frac{1}{2}\sqrt{m}\, a_L.$$

For ease of description, a phase difference between the signal light in the first pulse sequence and the local oscillator light is represented by $\theta_1$, a phase difference between the reference light in the first pulse sequence and the local oscillator light is represented by $\varphi_1$, a phase difference between the signal light in the second pulse sequence and the local oscillator light is represented by $\theta_2$, and a phase difference between the reference light in the second pulse sequence and the local oscillator light is represented by $\varphi_2$ below.

S72: Increase phases of both the third local oscillator light and the fourth local oscillator light by π/2, or increase phases of both the fifth local oscillator light and the sixth local oscillator light by π/2.

In this embodiment, the third pulse sequence, the fourth pulse sequence, the third local oscillator light, and the fourth local oscillator light are one group; and the fifth pulse sequence, the sixth pulse sequence, the fifth local oscillator light, and the sixth local oscillator light are the other group. One of the two groups of light is used to measure the X component of the signal light, and the other group is used to measure the P component of the signal light. Therefore, after the first pulse sequence and the first local oscillator light are split, phases of local oscillator beams in one group are separately increased by π/2.

For ease of description, in this embodiment, an example in which the phases of the fifth local oscillator light and the sixth local oscillator light are increased by π/2 is used for description.

S73: Perform homodyne detection on combined light of the third pulse sequence and the third local oscillator light and combined light of the fourth pulse sequence and the fourth local oscillator light, to output a first electrical signal.

In this embodiment, for a specific process and the principle of performing homodyne detection on the two beams of combined light, refer to explanations and descriptions of the embodiments shown in FIG. 4 and FIG. 5, and details are not described herein again.

As can be learned according to the descriptions of the embodiments shown in FIG. 4 and FIG. 5, in the signal pulses period, the first electrical signal $I_{1s} \propto m\sqrt{I_L}(P_s \cos\theta_1 - X_s \sin\theta_1)$; and in the reference pulses period, the first electrical signal $I_{1r} \propto m\sqrt{I_L}(P_r \cos\varphi_1 - X_r \sin\varphi_1)$.

S74: Perform homodyne detection on combined light of the fifth pulse sequence and the fifth local oscillator light and combined light of the sixth pulse sequence and the sixth local oscillator light, to output a second electrical signal.

In this embodiment, for a specific process and the principle of performing homodyne detection on the two beams of combined light, refer to explanations and descriptions of the embodiments shown in FIG. 4 and FIG. 5, and details are not described herein again.

Because the phases of the fifth local oscillator light and the sixth local oscillator light are greater than the phases of the third local oscillator light and the fourth local oscillator light by π/2, as can be learned according to the descriptions of the embodiments shown in FIG. 4 and FIG. 5, in the signal pulses period, the second electrical signal $I_{2s} \propto m\sqrt{I_L}(P_s \sin\theta_1 + X_s \cos\theta_1)$; and in the reference pulses period, the second electrical signal $I_{2r} \propto m\sqrt{I_L}(P_r \sin\varphi_1 + X_r \cos\varphi_1)$.

S75: Split the second pulse sequence into a seventh pulse sequence, an eighth pulse sequence, a ninth pulse sequence, and a tenth pulse sequence whose intensities are the same, and split the second local oscillator light into seventh local oscillator light, eighth local oscillator light, ninth local oscillator light, and tenth local oscillator light whose intensities are the same, where the seventh pulse sequence and the seventh local oscillator light are in a same polarization state, the eighth pulse sequence and the eighth local oscillator light are in a same polarization state, the ninth pulse sequence and the ninth local oscillator light are in a same polarization state, and the tenth pulse sequence and the tenth local oscillator light are in a same polarization state.

Each of the seventh pulse sequence, the eighth pulse sequence, the ninth pulse sequence, and the tenth pulse sequence includes reference light and signal light whose time sequences are alternate.

In the signal pulses period, light fields of both the seventh pulse sequence and the ninth pulse sequence are $$\frac{1}{2}\sqrt{n}\, a_s;$$

and light fields of the eighth pulse sequence and the tenth pulse sequence are both $$\frac{1}{2}\sqrt{n} \times ia_s.$$

In the reference pulses period, light fields of the seventh pulse sequence and the ninth pulse sequence are both $$\frac{1}{2}\sqrt{n} \times ia_r;$$

and light fields of the eighth pulse sequence and the tenth pulse sequence are both $$\frac{1}{2}\sqrt{n}\, a_r.$$

Light fields of the seventh local oscillator light and the ninth local oscillator light are both $$\frac{1}{2}\sqrt{n} \times ia_L;$$

and light fields of the eighth local oscillator light and the tenth local oscillator light are both $$\frac{1}{2}\sqrt{n}\, a_L.$$

S76: Increase phases of both the seventh local oscillator light and the eighth local oscillator light by π/2, or increase phases of both the ninth local oscillator light and the tenth local oscillator light by π/2.

In this embodiment, the seventh pulse sequence, the eighth pulse sequence, the seventh local oscillator light, and the eighth local oscillator light are one group; and the ninth pulse sequence, and the tenth pulse sequence, the ninth local oscillator light, and the tenth local oscillator light are the other group. One of the two groups of light is used to measure the X component of the signal light, and the other group is used to measure the P component of the signal light. Therefore, after the first pulse sequence and the first local oscillator light are split, phases of beams in one group are separately increased by π/2.

For ease of description, in this embodiment, an example in which the phases of the ninth local oscillator light and the tenth local oscillator light are increased by π/2 is used for description.

S77: Perform homodyne detection on combined light of the seventh pulse sequence and the seventh local oscillator light and combined light of the eighth pulse sequence and the eighth local oscillator light, to output a third electrical signal.

In this embodiment, for a specific process and the principle of performing homodyne detection on the two beams of combined light, refer to explanations and descriptions of the embodiments shown in FIG. 4 and FIG. 5, and this is not limited herein.

As can be learned according to the descriptions of the embodiments shown in FIG. 4 and FIG. 5, in the signal pulses period, the third electrical signal $I_{3s} \propto n\sqrt{I_L}(P_s \cos$ $\theta_2 - X_s \sin \theta_2$); and in the reference pulses period, the third electrical signal $I_{3r} \propto n\sqrt{I_L}(P_r \cos \varphi_2 - X_r \sin \varphi_2)$.

S78: Perform homodyne detection on combined light of the ninth pulse sequence and the ninth local oscillator light and combined light of the tenth pulse sequence and the tenth local oscillator light, to output a fourth electrical signal.

In this embodiment, for a specific process and the principle of performing homodyne detection on the two beams of combined light, refer to explanations and descriptions of the embodiments shown in FIG. 4 and FIG. 5, and details are not described herein again.

Because the phases of the ninth local oscillator light and the tenth local oscillator light are greater than the phases of the seventh local oscillator light and the eighth local oscillator light by π/2, as can be learned according to the descriptions of the embodiments shown in FIG. 4 and FIG. 5, in the signal pulses period, the fourth electrical signal $I_{4s} \propto n\sqrt{I_L}(P_s \sin \theta_2 + X_s \cos \theta_2)$; and in the reference pulses period, the fourth electrical signal $I_{4r} \propto n\sqrt{I_L}(P_r \sin \varphi_2 + X_r \cos \varphi_2)$.

Therefore, in this embodiment, the homodyne detection results obtained by separately performing homodyne detection on the first pulse sequence and the first local oscillator light, and the second pulse sequence and the second local oscillator light include the first electrical signal, the second electrical signal, the third electrical signal, and the fourth electrical signal.

Figure 8:
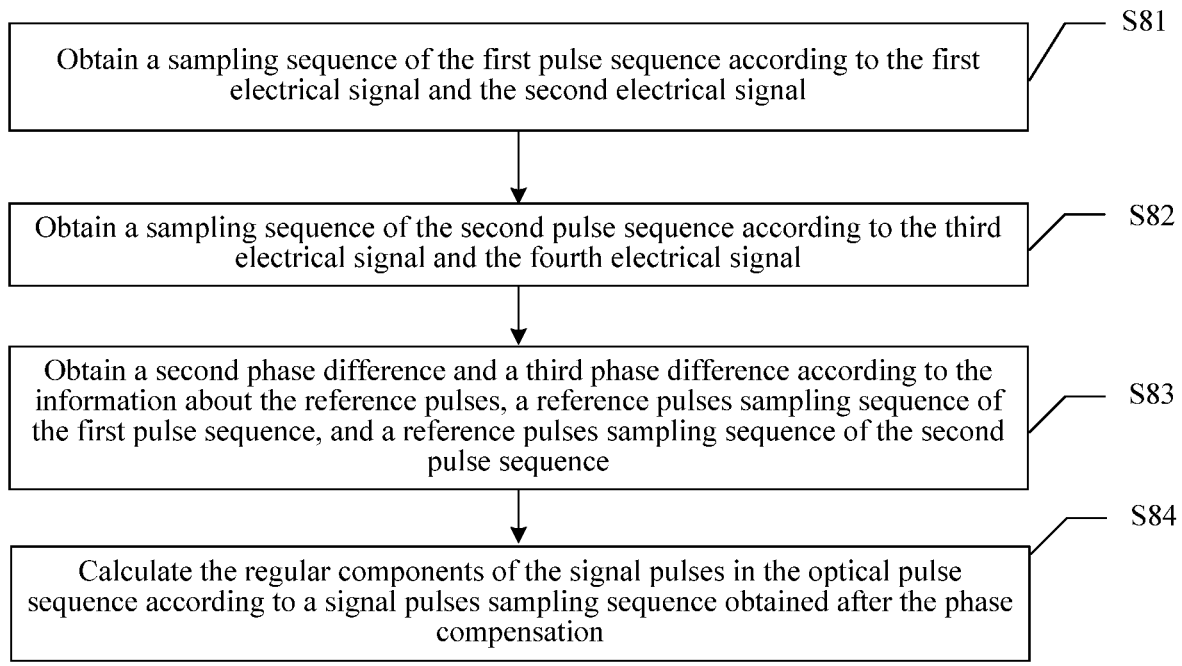
FIG. 8 is a schematic diagram of an embodiment of a method for obtaining regular components of the signal pulses in the optical pulse sequence.

Further, a method for calculating the regular components of the signal pulses for the first electrical signal, the second electrical signal, the third electrical signal, and the fourth electrical signal in the embodiment shown in FIG. 7 is described by using an example below with reference to the homodyne detection results. Referring to FIG. 8, FIG. 8 is a schematic diagram of an embodiment of a method for obtaining the regular components of the signal pulses in the optical pulse sequence. The method includes:

S81: Obtain a sampling sequence of the first pulse sequence according to the first electrical signal and the second electrical signal.

The sampling sequence of the first pulse sequence is represented by $I_5$ below. In the signal pulses period, $$I_5^2 = I_{1s}^2 + I_{2s}^2 \propto \left[m\sqrt{I_L}(P_s\cos\theta_1 - X_s\sin\theta_1)\right]^2 +$$
$$\left[m\sqrt{I_L}(P_s\sin\theta_1 + X_s\cos\theta_1)\right]^2$$
$$= m^2 I_L (X_s^2 + P_s^2);$$

and
in the reference pulses period, $$I_5^2 = I_{1r}^2 + I_{2r}^2 \propto \left[m\sqrt{I_L}(P_r\cos\varphi_1 - X_r\sin\varphi_1)\right]^2 +$$
$$\left[m\sqrt{I_L}(P_r\sin\varphi_1 + X_r\cos\varphi_1)\right]^2$$
$$= m^2 I_L (X_r^2 + P_r^2).$$

S82: Obtain a sampling sequence of the second pulse sequence according to the third electrical signal and the fourth electrical signal.

The sampling sequence of the second pulse sequence is represented by $I_6$ below. In the signal pulses period, $$I_6^2 = I_{3s}^2 + I_{4s}^2 \propto \left[n\sqrt{I_L}(P_s\cos\theta_2 - X_s\sin\theta_2)\right]^2 +$$
$$\left[n\sqrt{I_L}(P_s\sin\theta_2 + X_s\cos\theta_2)\right]^2$$
$$= n^2 I_L (X_s^2 + P_s^2);$$

and
in the reference pulses period, $$I_6^2 = I_{3r}^2 + I_{4r}^2 \propto \left[n\sqrt{I_L}(P_s\cos\varphi_2 - X_s\sin\varphi_2)\right]^2 +$$
$$\left[n\sqrt{I_L}(P_s\sin\varphi_2 + X_s\cos\varphi_2)\right]^2$$
$$= n^2 I_L (X_r^2 + P_r^2).$$

S83: Obtain a second phase difference and a third phase difference according to the information about the reference pulses, a reference pulses sampling sequence of the first pulse sequence, and a reference pulses sampling sequence of the second pulse sequence.

In this embodiment, the information about the reference pulses includes regular components $X_r$ and $P_r$ of the reference light, and a phase difference between the reference light and the local oscillator light. The second phase difference is $\theta_1$, and the third phase difference is $\theta_2$.

Specifically, in the reference pulses period, because $I_5^2 \propto m^2 I_L(X_r^2 + P_r^2)$, and $I_6^2 \propto n^2 I_L(X_r^2 + P_r^2)$, and the regular components $X_r$ and $P_r$ of the reference light are known, m and n can be calculated.

In the reference pulses period, the first electrical signal is $I_1^r$, and $$I_{1r} \propto m\sqrt{I_L}(P_r\cos\varphi_1 - X_r\sin\varphi_1) \text{, where}$$
$$= m\sqrt{I_L} \times \sqrt{X_r^2 + P_r^2}\left(\frac{P_r}{\sqrt{X_r^2 + P_r^2}}\cos\varphi_1 - \frac{X_r}{\sqrt{X_r^2 + P_r^2}}\sin\varphi_1\right)$$
$$= m\sqrt{I_L} \times \sqrt{X_r^2 + P_r^2}(\sin\delta\cos\varphi_1 - \cos\delta\sin\varphi_1)$$
$$= m\sqrt{I_L} \times \sqrt{X_r^2 + P_r^2}\sin(\delta - \varphi_1)$$

$$\sin\delta = \frac{P_r}{\sqrt{X_r^2 + P_r^2}}, \cos\delta = \frac{X_r}{\sqrt{X_r^2 + P_r^2}}, \tan\delta = \frac{P_r}{X_r}, \text{ and}$$

$$\delta = \arctan\frac{P_r}{X_r}.$$

Similarly, in the reference pulses period, the second electrical signal $I_{2r} \propto m\sqrt{I_L} \times \sqrt{X_r^2 + P_r^2}\cos(\delta - \varphi_1)$.

Therefore, $I_{1r}/I_{2r} = \tan(\delta - \varphi_1)$, that is, $$\arctan\frac{I_1}{I_2} = \delta - \varphi_1.$$

Therefore, $$\varphi_1 = \delta - \arctan\left(\frac{I_1}{I_2}\right) = \arctan\left(\frac{P_r}{X_r}\right) - \arctan\left(\frac{I_1}{I_2}\right).$$

Similarly, $\varphi_2 = \arctan\left(\frac{P_r}{X_r}\right) - \arctan\left(\frac{I_3}{I_4}\right).$ As can be learned according to the information about the reference pulses, the phase difference between the reference light and the signal light is known. Therefore, the second phase difference $\theta_1$ can be calculated according to the phase difference $\varphi_1$ between the reference light in the first pulse sequence and the local oscillator light and the phase difference between the reference light and the signal light, and the third phase difference $\theta_2$ is calculated according to the phase difference $\varphi_2$ between the reference light in the second pulse sequence and the local oscillator light and the phase difference between the reference light and the signal light.

S84: Calculate the regular components of the signal pulses in the optical pulse sequence according to the second phase difference, the third phase difference, the first electrical signal, the second electrical signal, the third electrical signal, and the fourth electrical signal.

Specifically, in the signal pulses period, the first electrical signal, the second electrical signal, the third electrical signal, and the fourth electrical signal are respectively:

$$I_{1s} \propto m\sqrt{I_L}(P_s \cos \theta_1 - X_s \sin \theta_1);$$

$$I_{2s} \propto m\sqrt{I_L}(P_s \sin \theta_1 + X_s \cos \theta_1);$$

$$I_{3s} \propto n\sqrt{I_L}(P_s \cos \theta_1 - X_s \sin \theta_1);$$

$$I_{4s} \propto n\sqrt{I_L}(P_s \cos \theta_1 + X_s \sin \theta_1);$$

therefore, $$I_{1s} \cos \theta_1 + I_{2s} \sin \theta_1 \propto m\sqrt{I_L}P_s(\cos^2\theta_1 + \sin^2\theta_1) = m\sqrt{I_L}P_s.$$

Similarly, $I_{3s} \cos \theta_1 + I_{4s} \sin \theta_1 \propto n\sqrt{I_L}P_s$;

therefore, $\sqrt{(I_{1s}\cos\theta_1+I_{2s}\sin\theta_1)^2+(I_{3s}\cos\theta_2+I_{4s}\sin\theta_2)^2}$;
and
$\propto \sqrt{m^2 I_L P_s^2 + n_2 I_L P_s^2} = \sqrt{m^2+n^2}\sqrt{I_L}P_s \propto P_s.$ Similarly, $X_s \propto \sqrt{(I_{2s}\cos\theta_1 - I_{2s}\sin\theta_1)^2 + (I_{4s}\cos\theta_2 - I_{3s}\sin\theta_2)^2}.$ Because the second phase difference $\theta_1$ and the third phase difference $\theta_2$ are known, the regular components $X_s$ and $P_s$ of the signal light are calculated.

In this embodiment, as can be learned according to the foregoing algorithms, when $\theta_1$ is different from $\theta_2$, and $\varphi_1$ is different from $\varphi_2$, the regular components of the signal light can still be calculated. Therefore, compared with the embodiments shown in FIG. 4 and FIG. 5, in this embodiment, the phase of the first pulse sequence is not required to be the same as the phase of the second pulse sequence.

In a current system, on a receive end, a dynamic polarization controller controls an optical pulse sequence, after the optical pulse sequence and local oscillator light are in a same polarization state, performs homodyne detection on the optical pulse sequence and the local oscillator light, and performs digital signal processing according to a homodyne detection result, to detect regular components of signal light in the optical pulse sequence.

In the foregoing embodiment in FIG. 3, the optical pulse sequence needs to be split into the first pulse sequence and the second pulse sequence, and the local oscillator light needs to be split into the first local oscillator light and the second local oscillator light; and homodyne detection is separately performed on the first pulse sequence and the first local oscillator light, and the second pulse sequence and the second local oscillator light, to obtain two homodyne detection results, so that an integration result obtained after the two homodyne detection results are integrated is independent of a ratio of each of the first and the second pulse sequences to the optical pulse sequence, that is, regardless of values of m and n, a result of calculating the regular components of the signal light is not affected.

Optionally, a difference from the embodiment shown in FIG. 3 lies in that, in this embodiment, after the received optical pulse sequence is split into the first pulse sequence and the second pulse sequence, a first ratio is further obtained. The first ratio is a ratio of the light intensity of the first pulse sequence to the light intensity of the optical pulse sequence, that is, the value of m described above is detected. Specifically, the light intensity of the first pulse sequence and the light intensity of the optical pulse sequence are detected, and then the ratio of the two light intensities is calculated, to obtain the value of m.

In this way, when homodyne detection is performed, homodyne detection does not need to be performed on the second pulse sequence and the second local oscillator light, and homodyne detection needs to be performed only on the first pulse sequence and the first local oscillator light; and digital signal processing is performed according to the homodyne detection result, to detect regular components of the signal light in the first pulse sequence. A method for the digital signal processing is the same as a digital processing method in the Background, and details are not described herein again.

Because the ratio of the light intensity of the signal light in the first pulse sequence to the light intensity of the signal light in the optical pulse sequence is m, the regular components of the signal light in the optical pulse sequence can be calculated according to the regular components of the signal light in the first pulse sequence and the ratio m. Specifically, assuming that the regular components X and P of the signal light in the optical pulse sequence are calculated according to the method in the prior art, in this embodiment, the regular components of the signal light in the first pulse sequence are represented by $X_1$ and $P_1$, and $X_1=\sqrt{m}X$ and $P_1=\sqrt{m}P$.

The quantum signal detection method in this application is described above, and a quantum signal detection apparatus in this application is described below.

Figure 9:
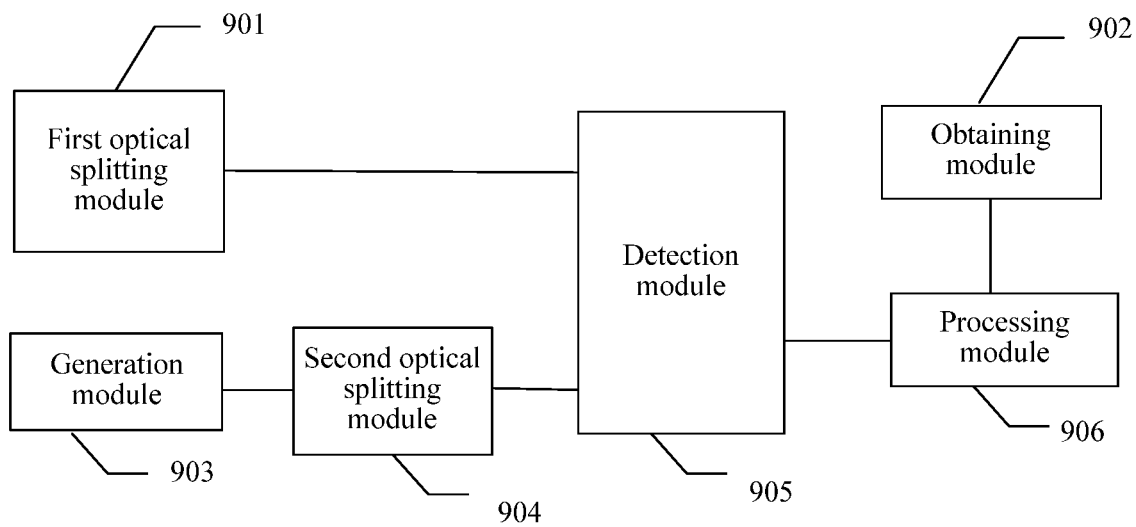
FIG. 9 is a schematic structural diagram of an embodiment of a quantum signal detection apparatus according to this application.

As shown in FIG. 9, FIG. 9 is a schematic structural diagram of an embodiment of a quantum signal detection apparatus according to this application. In this embodiment, the quantum signal detection apparatus includes: a first optical splitting module 901, configured to split a received optical pulse sequence into a first pulse sequence and a second pulse sequence that are in orthogonal polarization, where the optical pulse sequence includes reference pulses and signal pulses whose time sequences are alternate and frequencies are the same; an obtaining module 902, configured to obtain information about the reference pulses; a generation module 903, configured to generate local oscillator light, where the local oscillator light is a pulse sequence whose time sequence is coincident with a time sequence of the optical pulse sequence; a second optical splitting module 904, configured to split the local oscillator light into first local oscillator light and second local oscillator light whose intensities are the same and that are in orthogonal polarization, where the first local oscillator light and the first pulse sequence are in a same polarization state, and the second local oscillator light and the second pulse sequence are in a same polarization state; a detection module 905, configured to: perform homodyne detection on the first pulse sequence and the first local oscillator light, and perform homodyne detection on the second pulse sequence and the second local oscillator light, to obtain homodyne detection results; and a processing module 906, configured to obtain regular components of the signal pulses in the optical pulse sequence according to the homodyne detection results and the information about the reference pulses.

In this embodiment, the received optical pulse sequence is split into the first and the second pulse sequences that are in orthogonal polarization; and the generated local oscillator light is split into the first and the second local oscillator light that are in orthogonal polarization, where the first pulse sequence and the first local oscillator light are in the same polarization state, and the second pulse sequence and the second local oscillator light are in the same polarization state. In this way, homodyne detection can be performed on the optical pulse sequence and the local oscillator light without using a dynamic polarization controller, so that the method is simple and costs are relatively low. In addition, in this embodiment, homodyne detection is separately performed on the first pulse sequence and the first local oscillator light, and the second pulse sequence and the second local oscillator light, and in a process of performing processing by using the homodyne detection results, a ratio of each of the first and the second pulse sequences to the optical pulse sequence can be canceled, so that the processing result is independent of the ratio of each of the first and the second pulse sequences to the optical pulse sequence.

Optionally, the detection module 905 is specifically configured to: split the first pulse sequence into a third pulse sequence and a fourth pulse sequence whose intensities are the same; split the first local oscillator light into third local oscillator light and fourth local oscillator light whose intensities are the same, where the third local oscillator light and the third pulse sequence are in a same polarization state, and the fourth local oscillator light and the fourth pulse sequence are in a same polarization state; split the second pulse sequence into a fifth pulse sequence and a sixth pulse sequence whose intensities are the same; split the second local oscillator light into fifth local oscillator light and sixth local oscillator light whose intensities are the same, where the fifth local oscillator light and the fifth pulse sequence are in a same polarization state, and the sixth local oscillator light and the sixth pulse sequence are in a same polarization state; perform homodyne detection on combined light of the third pulse sequence and the third local oscillator light and combined light of the fourth pulse sequence and the fourth local oscillator light, to obtain a first electrical signal; and perform homodyne detection on combined light of the fifth pulse sequence and the fifth local oscillator light and combined light of the sixth pulse sequence and the sixth local oscillator light, to obtain a second electrical signal.

Further, optionally, the processing module 906 is specifically configured to: obtain a reference pulses sampling sequence and a signal pulses sampling sequence according to the first electrical signal and the second electrical signal; calculate a first phase difference according to the information about the reference pulses, the reference pulses sampling sequence, and the signal pulses sampling sequence, where the first phase difference is a phase difference between the signal pulses in the optical pulse sequence and the local oscillator light; determine a quantum state measurement base, and perform phase compensation on the signal pulses sampling sequence according to the first phase difference and the quantum state measurement base; and calculate the regular components of the signal pulses in the optical pulse sequence according to a signal pulses sampling sequence obtained after the phase compensation.

Optionally, in this embodiment, the quantum signal detection apparatus is the quantum signal receiver on the receive end in the communications system shown in FIG. 2. The modules in the quantum signal detection apparatus are respectively implemented in a plurality of manners. One implementation thereof is described below by using an example with reference to FIG. 10.

Figure 10:
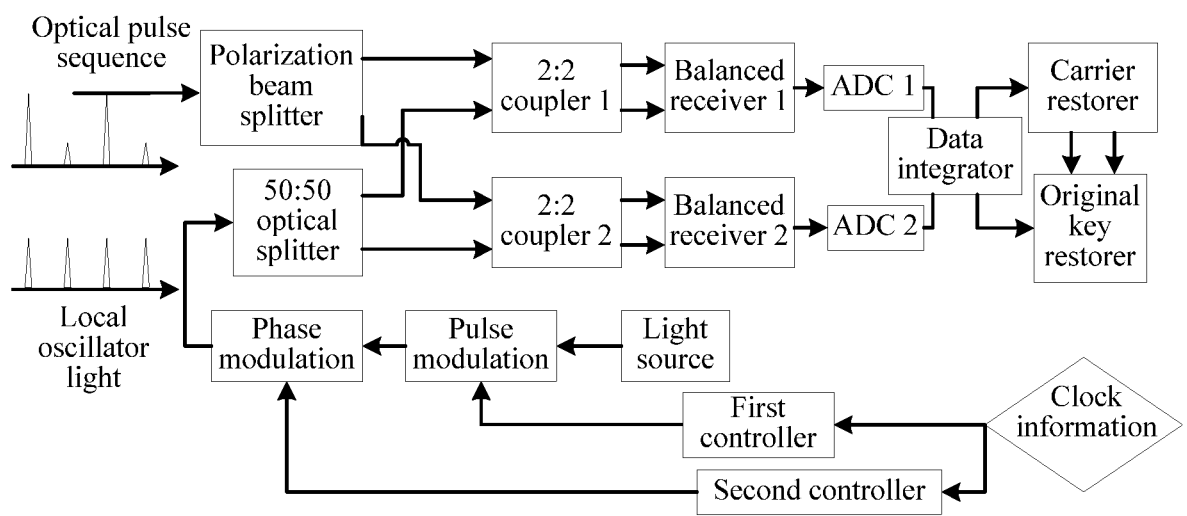
FIG. 10 is a schematic structural diagram of another embodiment of a quantum signal detection apparatus according to this application.

As shown in FIG. 10, in this embodiment, the first optical splitting module is specifically a polarization beam splitter. The generation module specifically includes a laser source, a pulse modulator, a phase modulator, a first controller, and a second controller. The second optical splitting module includes a 50:50 optical splitter. The detection module specifically includes a 2:2 coupler 1, a 2:2 coupler 2, a balanced receiver 1, and a balanced receiver 2. The processing module specifically includes an analog-to-digital converter (ADC) 1, an ADC 2, a data integrator, a carrier restorer, and a key restorer.

A working process of the quantum signal detection apparatus shown in FIG. 10 is described below.

In the generation module, continuous light output by the laser source is modulated by the pulse modulator, and then pulse light is output. After the pulse light is further modulated by the phase modulator, pulse light with phase information is output, that is, the local oscillator light. In reference pulses period, the first controller is configured to control the pulse modulator to output a pulse whose light intensity is relatively low, and the second controller is configured to modulate a fixed phase (for example, 0 or $\pi/2$). In signal pulses period, the first controller is configured to control the pulse modulator to output a pulse whose light intensity is relatively high, and the second controller is configured to: select a measurement base, and modulate a phase of the pulse according to the selected measurement base.

In the first optical splitting module, the polarization beam splitter is configured to: receive the optical pulse sequence, and split the received optical pulse sequence into the first pulse sequence and the second pulse sequence that are in orthogonal polarization.

In the second optical splitting module, the 50:50 optical splitter is configured to: receive the local oscillator light output by the generation module, and split the local oscillator light into two paths of light whose intensities are the same, that is, the first local oscillator light and the second local oscillator light, where the polarization states of the two paths of light are respectively the same as the polarization states of the two paths of light output by the polarization beam splitter.

In the detection module, the two paths of light output by the polarization beam splitter are respectively input to the 2:2 coupler 1 and the 2:2 coupler 2; and the two paths of light output by the 50:50 optical splitter are respectively input to the 2:2 coupler 1 and the 2:2 coupler 2. After the first local oscillator light and the first pulse sequence are split and interfered with in the 2:2 coupler 1, two paths of optical signals output by the 2:2 coupler 1 are separately input to the balanced receiver 1 for homodyne detection. After the second local oscillator light and the second pulse sequence are split and interfered with in the 2:2 coupler 2, two paths of optical signals output by the 2:2 coupler 2 are separately input to the balanced receiver 2 for homodyne detection.

In this embodiment, the obtaining module is specifically integrated in the carrier restorer, and is configured to obtain the information about the reference pulses from the negotiation information transceiver on the receive end.

In the processing module, the ADC 1 is configured to: receive an electrical signal output by the balanced receiver 1, and output a reference pulses sampling sequence and a signal pulses sampling sequence; and the ADC 2 is configured to: receive an electrical signal output by the balanced receiver 2, and output a reference pulses sampling sequence and a signal pulses sampling sequence. The data integrator is configured to: integrate the reference pulses sampling sequence output by the ADC 1 and the reference pulses sampling sequence output by the ADC 2, and integrate the signal pulses sampling sequence output by the ADC 1 and the signal pulses sampling sequence output by the ADC 2; and input a reference pulses sampling sequence and a signal pulses sampling sequence that are obtained after the integration to the carrier restorer. The carrier restorer calculates the phase difference between the signal pulses in the optical pulse sequence and the local oscillator light according to the reference pulses sampling sequence and the information about the reference pulses, and performs phase compensation on the signal pulses sampling sequence by using the phase difference and the quantum state measurement base. The key restorer further calculates the regular components of the signal pulses in the optical pulse sequence according to the signal pulses sampling sequence obtained after the phase compensation.

Optionally, in the embodiment shown in FIG. 9, the detection module 905 is specifically configured to: evenly split the first pulse sequence into a third pulse sequence, a fourth pulse sequence, a fifth pulse sequence, and a sixth pulse sequence whose intensities are the same, and split the first local oscillator light into third local oscillator light, fourth local oscillator light, fifth local oscillator light, and sixth local oscillator light whose intensities are the same, where the third pulse sequence and the third local oscillator light are in a same polarization state, the fourth pulse sequence and the fourth local oscillator light are in a same polarization state, the fifth pulse sequence and the fifth local oscillator light are in a same polarization state, and the sixth pulse sequence and the sixth local oscillator light are in a same polarization state; increase phases of both the third local oscillator light and the fourth local oscillator light by $\pi/2$, or increase phases of both the fifth local oscillator light and the sixth local oscillator light by $\pi/2$; perform homodyne detection on combined light of the third pulse sequence and the third local oscillator light and combined light of the fourth pulse sequence and the fourth local oscillator light, to output a first electrical signal; perform homodyne detection on combined light of the fifth pulse sequence and the fifth local oscillator light and combined light of the sixth pulse sequence and the sixth local oscillator light, to output a second electrical signal; split the second pulse sequence into a seventh pulse sequence, an eighth pulse sequence, a ninth pulse sequence, and a tenth pulse sequence whose intensities are the same, and split the second local oscillator light into seventh local oscillator light, eighth local oscillator light, ninth local oscillator light, and tenth local oscillator light whose intensities are the same, where the seventh pulse sequence and the seventh local oscillator light are in a same polarization state, the eighth pulse sequence and the eighth local oscillator light are in a same polarization state, the ninth pulse sequence and the ninth local oscillator light are in a same polarization state, and the tenth pulse sequence and the tenth local oscillator light are in a same polarization state; increase phases of both the seventh local oscillator light and the eighth local oscillator light by $\pi/2$, or increase phases of both the ninth local oscillator light and the tenth local oscillator light by $\pi/2$; perform homodyne detection on combined light of the seventh pulse sequence and the seventh local oscillator light and combined light of the eighth pulse sequence and the eighth local oscillator light, to output a third electrical signal; and perform homodyne detection on combined light of the ninth pulse sequence and the ninth local oscillator light and combined light of the tenth pulse sequence and the tenth local oscillator light, to output a fourth electrical signal.

For specific explanations of the detection module 905, refer to explanations and descriptions of the embodiment shown in FIG. 4, and details are not described herein again.

Further, optionally, the processing module 906 is specifically configured to: obtain a sampling sequence of the first pulse sequence according to the first electrical signal and the second electrical signal; obtain a sampling sequence of the second pulse sequence according to the third electrical signal and the fourth electrical signal; obtain a second phase difference and a third phase difference according to the information about the reference pulses, a reference pulses sampling sequence of the first pulse sequence, and a reference pulses sampling sequence of the second pulse sequence, where the second phase difference is a phase difference between the signal pulses in the first pulse sequence and the local oscillator light, and the second phase difference is a phase difference between signal pulses in the second pulse sequence and the local oscillator light; and calculate the regular components of the signal pulses in the optical pulse sequence according to the second phase difference, the third phase difference, the first electrical signal, the second electrical signal, the third electrical signal, and the fourth electrical signal.

In this embodiment, the modules in the quantum signal detection apparatus are respectively implemented in a plurality of manners. One implementation thereof is described below by using an example with reference to FIG. 11.

Figure 11:
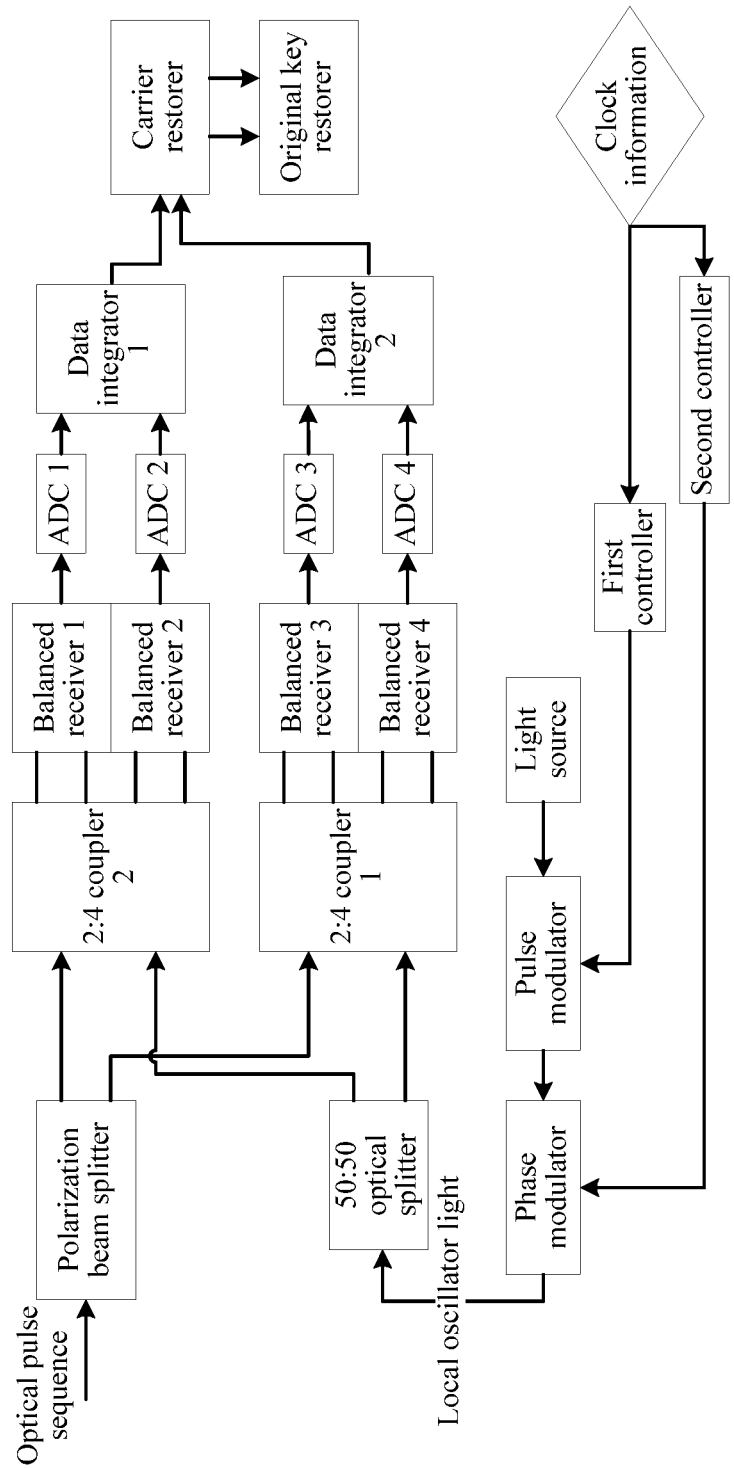
FIG. 11 is a schematic structural diagram of another embodiment of a quantum signal detection apparatus according to this application.

As shown in FIG. 11, in this embodiment, the first optical splitting module is specifically a polarization beam splitter. The generation module specifically includes a laser source, a pulse modulator, a phase modulator, a first controller, and a second controller. The second optical splitting module is specifically a 50:50 optical splitter. The detection module specifically includes a 2:4 coupler 1, a 2:4 coupler 2, a balanced receiver 1, a balanced receiver 2, a balanced receiver 3, and a balanced receiver 4. The processing module specifically includes an ADC 1, an ADC 2, an ADC 3, an ADC 4, a data integrator 1, a data integrator 2, a carrier restorer, and a key restorer.

A working process of the quantum signal detection apparatus shown in FIG. 11 is described below.

Working processes of the components in the generation module are the same as working processes of the generation module in the embodiment shown in FIG. 10, and details are not described herein again.

A working process of the first optical splitting module is the same as a working process of the first optical splitting module in the embodiment shown in FIG. 10, and details are not described herein again. A working process of the second optical splitting module is the same as a working process of the second optical splitting module in the embodiment shown in FIG. 10, and details are not described herein again. A working process of the obtaining module is the same as a working process of the obtaining module in the embodiment shown in FIG. 10, and details are not described herein again.

In the detection module, the two paths of light output by the polarization beam splitter are respectively input to the 2:4 coupler 1 and the 2:4 coupler 2; and the two paths of light output by the first optical splitting module are respectively input to the 2:4 coupler 1 and the 2:4 coupler 2. The first local oscillator light and the first pulse sequence are split, combined, and interfered with in the 2:4 coupler 1; and the second local oscillator light and the second pulse sequence are split, combined, and interfered with in the 2:4 coupler 2. For specific methods for light splitting, combination, and interference, refer to the embodiment shown in FIG. 7, and details are not described herein again.

In the four paths of optical signals output by the 2:4 coupler 1, the combined light of the third pulse sequence and the third local oscillator light, and the combined light of the fourth pulse sequence and the fourth local oscillator light are input to the balanced receiver 1 for homodyne detection, and the other two paths of optical signals are output to the balanced receiver 2 for homodyne detection. In the four paths of optical signals output by the 2:4 coupler 2, two paths of optical signals are input to the balanced receiver 3 for homodyne detection, and the other two paths of optical signals are output to the balanced receiver 4 for homodyne detection.

In the processing module, the ADC 1 is configured to: receive an electrical signal output by the balanced receiver 1, and output a reference pulses sampling sequence and a signal pulses sampling sequence; the ADC 2 is configured to: receive an electrical signal output by the balanced receiver 2, and output a reference pulses sampling sequence and a signal pulses sampling sequence; the ADC 3 is configured to: receive an electrical signal output by the balanced receiver 3, and output a reference pulses sampling sequence and a signal pulses sampling sequence; and the ADC 4 is configured to: receive an electrical signal output by the balanced receiver 4, and output a reference pulses sampling sequence and a signal pulses sampling sequence.

The data integrator 1 is configured to integrate the reference pulses sampling sequences respectively output by the ADC 1 and the ADC 2, and integrate the signal pulses sampling sequences respectively output by the ADC 1 and the ADC 2; and input a sampling sequence of the first pulse sequence obtained after the integration to the carrier restorer.

The data integrator 2 is configured to integrate the reference pulses sampling sequences respectively output by the ADC 3 and the ADC 4, and integrate the signal pulses sampling sequences respectively output by the ADC 3 and the ADC 4; and input a sampling sequence of the second pulse sequence obtained after the integration to the carrier restorer.

For a working process of the carrier restorer, refer to explanations and descriptions of step S83 in the embodiment shown in FIG. 8, and for a working process of the key restorer, refer to explanations and descriptions of step S84 in the embodiment shown in FIG. 8; and details are not described herein again.

Figure 12:
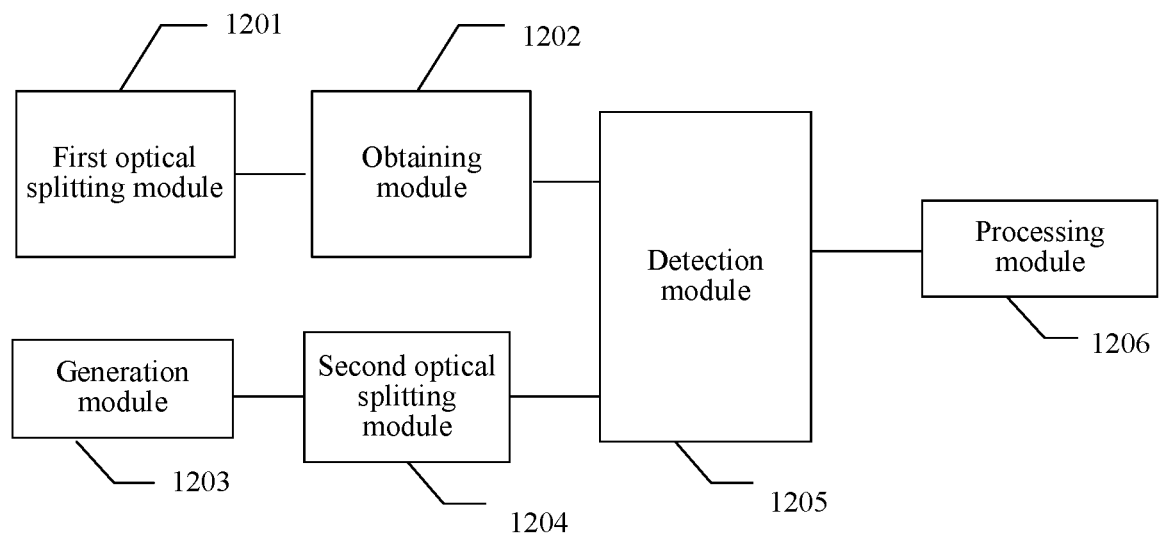
FIG. 12 is a schematic structural diagram of another embodiment of a quantum signal detection apparatus according to this application.

As shown in FIG. 12, FIG. 12 is a schematic structural diagram of another embodiment of a quantum signal detection apparatus according to this application. In this embodiment, the quantum signal detection apparatus includes: a first optical splitting module 1201, configured to split a received optical pulse sequence into a first pulse sequence and a second pulse sequence, where the first pulse sequence includes reference pulses and signal pulses whose time sequences are alternate and frequencies are the same, and a polarization direction of the first pulse sequence is a preset direction; an obtaining module 1202, configured to detect a first ratio, where the first ratio is a ratio of a light intensity of the first pulse sequence to a light intensity of the optical pulse sequence; a generation module 1203, configured to generate local oscillator light, where the local oscillator light is a pulse sequence whose time sequence is coincident with a time sequence of the optical pulse sequence; a second optical splitting module 1204, configured to split the local oscillator light into first local oscillator light and second local oscillator light, where the first local oscillator light and the first pulse sequence are in a same polarization state; a detection module 1205, configured to perform homodyne detection on the first pulse sequence and the local oscillator light, to obtain a homodyne detection result; and a processing module 1206, configured to obtain regular components of the signal pulses in the optical pulse sequence according to the homodyne detection result and the first ratio.

In this embodiment, the obtaining module 1203 specifically includes a detector, configured to: detect a light intensity of the signal pulses in the first pulse sequence and a light intensity of signal pulses in the optical pulse sequence, and calculate a ratio of the two light intensities, that is, the first ratio. Implementations of the first optical splitting module 1201, the generation module 1203, and the second optical splitting module 1204 are the same as implementations in the embodiment shown in FIG. 10, and details are not described herein again. Implementations of the detection module 1205 and the processing module 1206 are the same as those in the prior art, and details are not described herein again.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:
splitting a received optical pulse sequence into a first pulse sequence and a second pulse sequence, wherein the first pulse sequence and the second pulse sequence are in orthogonal polarization, wherein the received optical pulse sequence comprises a plurality of reference pulses and a plurality of signal pulses, wherein a first time sequence of the plurality of reference pulses is alternate to a second time sequence of the plurality of signal pulses, and first frequencies of the plurality of reference pulses are same as second frequencies of the plurality of signal pulses, and wherein the plurality of signal pulses are quantum signal pulses;
obtaining information about the plurality of reference pulses;
generating a first local oscillator light, wherein the first local oscillator light is a third pulse sequence, and a third time sequence of the first local oscillator light is coincident with a fourth time sequence of the received optical pulse sequence;
splitting the first local oscillator light into a second local oscillator light and a third local oscillator light, wherein a first intensity of the second local oscillator light is same as a second intensity of the third local oscillator light, the second local oscillator light and the third local oscillator light are in orthogonal polarization, wherein a first polarization state of the second local oscillator light is same as a second polarization state of the first pulse sequence, and a third polarization state of the third local oscillator light is same as a fourth polarization state of the second pulse sequence;
performing a first homodyne detection on the first pulse sequence and the second local oscillator light, and performing a second homodyne detection on the second pulse sequence and the third local oscillator light, to obtain a plurality of homodyne detection results; and
obtaining a plurality of regular components of the plurality of signal pulses in the received optical pulse sequence according to the plurality of homodyne detection results and the information about the plurality of reference pulses.

2. The method according to claim 1, wherein performing the first homodyne detection on the first pulse sequence and the second local oscillator light, and performing the second homodyne detection on the second pulse sequence and the third local oscillator light, to obtain the plurality of homodyne detection results, comprises:
splitting the first pulse sequence into a fourth pulse sequence and a fifth pulse sequence, wherein a third intensity of the fourth pulse sequence is same as a fourth intensity of the fifth pulse sequence;
splitting the second local oscillator light into a fourth local oscillator light and a fifth local oscillator light, wherein a fifth intensity of the fourth local oscillator light is same as a sixth intensity of the fifth local oscillator light, wherein a fifth polarization state of the fourth local oscillator light is same as a sixth polarization state of the fourth pulse sequence, and a seventh polarization state of the fifth local oscillator light is same as an eighth polarization state of the fifth pulse sequence;
splitting the second pulse sequence into a sixth pulse sequence and a seventh pulse sequence, wherein a seventh intensity of the sixth pulse sequence is same as an eighth intensity of the seventh pulse sequence;
splitting the third local oscillator light into a sixth local oscillator light and a seventh local oscillator light, wherein a ninth intensity of the sixth local oscillator light is same as a tenth intensity of the seventh local oscillator light, wherein a ninth polarization state of the sixth local oscillator light is same as a tenth polarization state of the sixth pulse sequence, and an eleventh polarization state of the seventh local oscillator light is same as a twelfth polarization state of the seventh pulse sequence;
performing the first homodyne detection on combined light of the fourth pulse sequence and the fourth local oscillator light, and on combined light of the fifth pulse sequence and the fifth local oscillator light, to obtain a first electrical signal; and
performing the second homodyne detection on combined light of the sixth pulse sequence and the sixth local oscillator light, and on combined light of the seventh pulse sequence and the seventh local oscillator light, to obtain a second electrical signal.

3. The method according to claim 2, wherein obtaining the plurality of regular components of the plurality of signal pulses in the received optical pulse sequence according to the plurality of homodyne detection results and the information about the plurality of reference pulses comprises:
obtaining a first sampling sequence and a second sampling sequence according to the first electrical signal and the second electrical signal, wherein the first sampling sequence is of the plurality of reference pulses and the second sampling sequence is of the plurality of signal pulses;
calculating a first phase difference according to the information about the plurality of reference pulses, the first sampling sequence, and the second sampling sequence, wherein the first phase difference is between the plurality of signal pulses in the received optical pulse sequence and the first local oscillator light;
determining a quantum state measurement base, and performing phase compensation on the second sampling sequence according to the first phase difference and the quantum state measurement base, to obtain a phase compensated second sampling sequence; and
calculating the plurality of regular components of the plurality of signal pulses in the received optical pulse sequence according to the phase compensated second sampling sequence.

4. The method according to claim 1, wherein performing the first homodyne detection on the first pulse sequence and the second local oscillator light, and performing the second homodyne detection on the second pulse sequence and the third local oscillator light, to obtain the plurality of homodyne detection results comprises:
evenly splitting the first pulse sequence into a fourth pulse sequence, a fifth pulse sequence, a sixth pulse sequence, and a seventh pulse sequence, wherein a third intensity is of the fourth pulse sequence, a fourth intensity is of the fifth pulse sequence, a fifth intensity is of the sixth pulse sequence, and a sixth intensity is of the seventh pulse sequence, and wherein the third intensity, the fourth intensity, the fifth intensity, and the sixth intensity are same;

splitting the second local oscillator light into a fourth local oscillator light, a fifth local oscillator light, a sixth local oscillator light, and a seventh local oscillator light, wherein a seventh intensity is of the fourth local oscillator light, an eighth intensity is of the fifth local oscillator light, a ninth intensity is of the sixth local oscillator light, a tenth intensity is of the seventh local oscillator light, wherein the seventh intensity, the eighth intensity, the ninth intensity, and the tenth intensity are same, wherein a fifth polarization state of the fourth pulse sequence is same as a sixth polarization state of the fourth local oscillator light, a seventh polarization state of the fifth pulse sequence is same as an eighth polarization state of the fifth local oscillator light, a ninth polarization state of the sixth pulse sequence is same as a tenth polarization state of the sixth local oscillator light, and an eleventh polarization state of the seventh pulse sequence is same as a twelfth polarization state of the seventh local oscillator light;

increasing a first phase of the fourth local oscillator light by $\pi/2$ and increasing a second phase of the fifth local oscillator light by $\pi/2$, or increasing a third phase of the sixth local oscillator light by $\pi/2$ and increasing a fourth phase of the seventh local oscillator light by $\pi/2$;

performing the first homodyne detection on combined light of the fourth pulse sequence and the fourth local oscillator light and on combined light of the fifth pulse sequence and the fifth local oscillator light, to output a first electrical signal;

performing the first homodyne detection on combined light of the sixth pulse sequence and the sixth local oscillator light and on combined light of the seventh pulse sequence and the seventh local oscillator light, to output a second electrical signal;

splitting the second pulse sequence into an eighth pulse sequence, a ninth pulse sequence, a tenth pulse sequence, and an eleventh pulse sequence, wherein an eleventh intensity is of the eighth pulse sequence, a twelfth intensity is of the ninth pulse sequence, a thirteenth intensity is of the tenth pulse sequence, a fourteenth intensity is of the eleventh pulse sequence, and wherein the eleventh intensity, the twelfth intensity, the thirteenth intensity, and the fourteenth intensity are same, and splitting the third local oscillator light into an eighth local oscillator light, a ninth local oscillator light, a tenth local oscillator light, and an eleventh local oscillator light, wherein a fifteenth intensity is of the eighth local oscillator light, a sixteenth intensity is of the ninth local oscillator light, a seventeenth intensity is of the tenth local oscillator light, and an eighteenth intensity is of the eleventh local oscillator light, wherein the fifteenth intensity, the sixteenth intensity, the seventeenth intensity, and the eighteenth intensity are same, wherein a thirteenth polarization state of the eighth pulse sequence is same as a fourteenth polarization state of the eighth local oscillator light, a fifteenth polarization state of the ninth pulse sequence is same as a sixteenth polarization state of the ninth local oscillator light, a seventeenth polarization state of the tenth pulse sequence is same as an eighteenth polarization state of the tenth local oscillator light, and a nineteenth polarization state of the eleventh pulse sequence is same as a twentieth polarization state of the eleventh local oscillator light;

increasing a fifth phase of the eighth local oscillator light by $\pi/2$ and increasing a sixth phase of the ninth local oscillator light by $\pi/2$, or increasing a seventh phase of the tenth local oscillator light by $\pi/2$ and increasing an eighth phase of the eleventh local oscillator light by $\pi/2$;

performing the second homodyne detection on combined light of the eighth pulse sequence and the eighth local oscillator light and on combined light of the ninth pulse sequence and the ninth local oscillator light, to output a third electrical signal; and performing the second homodyne detection on combined light of the tenth pulse sequence and the tenth local oscillator light and combined light of the eleventh pulse sequence and the eleventh local oscillator light, to output a fourth electrical signal.

5. The method according to claim 4, wherein obtaining the plurality of regular components of the plurality of signal pulses in the received optical pulse sequence according to the plurality of homodyne detection results and the information about the plurality of reference pulses comprises:

obtaining a first sampling sequence of the first pulse sequence according to the first electrical signal and the second electrical signal;

obtaining a second sampling sequence of the second pulse sequence according to the third electrical signal and the fourth electrical signal;

obtaining a second phase difference and a third phase difference according to the information about the plurality of reference pulses, a third sampling sequence, and a fourth sampling sequence, wherein the third sampling sequence is of reference pulses of the first pulse sequence, and the fourth sampling sequence is of reference pulses of the second pulse sequence, wherein the second phase difference is a phase difference between signal pulses in the first pulse sequence and the first local oscillator light, and the third phase difference is a phase difference between signal pulses in the second pulse sequence and the first local oscillator light; and calculating the plurality of regular components of the plurality of signal pulses in the received optical pulse sequence according to the second phase difference, the third phase difference, the first electrical signal, the second electrical signal, the third electrical signal, and the fourth electrical signal.

6. A method, comprising:

splitting a received optical pulse sequence into a first pulse sequence and a second pulse sequence, wherein the first pulse sequence comprises a plurality of reference pulses and a plurality of signal pulses, wherein a first time sequence of the plurality of reference pulses is alternate to a second time sequence of the plurality of signal pulses, wherein first frequencies of the plurality of reference pulses are same as second frequencies of the plurality of signal pulses, and the plurality of signal pulses are quantum signal pulses;

obtaining a first ratio, wherein the first ratio is of a first light intensity to a second light intensity, wherein the first light intensity is of the first pulse sequence, and the second light intensity is of the received optical pulse sequence;

generating a first local oscillator light, wherein the first local oscillator light is a third pulse sequence, and wherein a third time sequence of the first local oscillator light is coincident with a fourth time sequence of the received optical pulse sequence;
splitting the first local oscillator light into a second local oscillator light and a third local oscillator light, wherein a first polarization state of the second local oscillator light is same as a second polarization state of the first pulse sequence;
performing homodyne detection on the first pulse sequence and the first local oscillator light, to obtain a homodyne detection result; and
obtaining a plurality of regular components of the plurality of signal pulses in the received optical pulse sequence according to the homodyne detection result and the first ratio.

7. The method according to claim 6, further comprising:
detecting the first light intensity of signal pulses in the first pulse sequence and the second light intensity of signal pulses in the received optical pulse sequence, and calculate the first ratio.

8. An apparatus, comprising:
a first optical splitter, configured to split a received optical pulse sequence into a first pulse sequence and a second pulse sequence, wherein the first pulse sequence and the second pulse sequence are in orthogonal polarization, wherein the received optical pulse sequence comprises a plurality of reference pulses and a plurality of signal pulses, a first time sequence of the plurality of reference pulses is alternate to a second time sequence of the plurality of signal pulses, and first frequencies of the plurality of reference pulses are same as second frequencies of the plurality of signal pulses;
an identifier, configured to obtain information about the plurality of reference pulses;
a generator, configured to generate a first local oscillator light, wherein the first local oscillator light is a third pulse sequence, and a third time sequence of the third pulse sequence is coincident with a fourth time sequence of the received optical pulse sequence;
a second optical splitter, configured to split the first local oscillator light into a second local oscillator light and a third local oscillator light, wherein a first intensity of the second local oscillator light is same as a second intensity of the third local oscillator light, and the second local oscillator light and the third local oscillator light are in orthogonal polarization, wherein a first polarization state of the second local oscillator light is same as a second polarization state of the first pulse sequence, and a third polarization state of the second local oscillator light is same as a fourth polarization state as the second pulse sequence;
a detector, configured to:
perform a first homodyne detection on the first pulse sequence and the second local oscillator light, and perform a second homodyne detection on the second pulse sequence and the third local oscillator light, to obtain a plurality of homodyne detection results; and
a processor, configured to obtain a plurality of regular components of the plurality of signal pulses in the received optical pulse sequence according to the plurality of homodyne detection results and the information about the plurality of reference pulses.

9. The apparatus according to claim 8, wherein the detector is configured to:
split the first pulse sequence into a fourth pulse sequence and a fifth pulse sequence, wherein a third intensity of the fourth pulse sequence is same as a fourth intensity of the fifth pulse sequence;
split the second local oscillator light into a fourth local oscillator light and a fifth local oscillator light, wherein a fifth intensity of the fourth local oscillator light is same as a sixth intensity of the fifth local oscillator light, wherein a fifth polarization state of the fourth local oscillator light is same as a sixth polarization state of the fourth pulse sequence, and a seventh polarization state of the fifth local oscillator light is same as an eighth polarization state of the fifth pulse sequence;
split the second pulse sequence into a sixth pulse sequence and a seventh pulse sequence, wherein a seventh intensity of the sixth pulse sequence is same as an eighth intensity of the seventh pulse sequence;
split the third local oscillator light into a sixth local oscillator light and a seventh local oscillator light, wherein a ninth intensity of the sixth local oscillator light is same as a tenth intensity of the seventh local oscillator light, wherein a ninth polarization state of the sixth local oscillator light is same as a tenth polarization state of the sixth pulse sequence, and an eleventh polarization state of the seventh local oscillator light is same as a twelfth polarization state of the seventh pulse sequence;
perform the first homodyne detection on combined light of the fourth pulse sequence and the fourth local oscillator light and on combined light of the fifth pulse sequence and the fifth local oscillator light, to obtain a first electrical signal; and
perform the second homodyne detection on combined light of the sixth pulse sequence and the sixth local oscillator light and on combined light of the seventh pulse sequence and the seventh local oscillator light, to obtain a second electrical signal.

10. The apparatus according to claim 9, wherein the processor is configured to:
obtain a first sampling sequence and a second sampling sequence according to the first electrical signal and the second electrical signal, wherein the first sampling sequence is of the plurality of reference pulses and the second sampling sequence is of the plurality of signal pulses;
calculate a first phase difference according to the information about the plurality of reference pulses, the first sampling sequence, and the second sampling sequence, wherein the first phase difference is between the plurality of signal pulses in the received optical pulse sequence and the first local oscillator light;
determine a quantum state measurement base, and perform phase compensation on the second sampling sequence according to the first phase difference and the quantum state measurement base, to obtain a phase compensated second sampling sequence; and
calculate the plurality of regular components of the plurality of signal pulses in the received optical pulse sequence according to the phase compensated second sampling sequence.

11. The apparatus according to claim 8, wherein the detector is configured to:
evenly split the first pulse sequence into a fourth pulse sequence, a fifth pulse sequence, a sixth pulse sequence, and a seventh pulse sequence, wherein a third intensity is of the fourth pulse sequence, a fourth intensity is of the fifth pulse sequence, a fifth intensity is of the sixth pulse sequence, and a sixth intensity is of the seventh pulse sequence, and wherein the third intensity, the fourth intensity, the fifth intensity, and the sixth intensity are same;

split the second local oscillator light into a fourth local oscillator light, a fifth local oscillator light, a sixth local oscillator light, and a seventh local oscillator light, wherein a seventh intensity is of the fourth local oscillator light, an eighth intensity is of the fifth local oscillator light, a ninth intensity is of the sixth local oscillator light, a tenth intensity is of the seventh local oscillator light, wherein the seventh intensity, the eighth intensity, the ninth intensity, and the tenth intensity are same, wherein a fifth polarization state of the fourth pulse sequence is same as a sixth polarization state of the fourth local oscillator light, a seventh polarization state of the fifth pulse sequence is same as an eighth polarization state of the fifth local oscillator light, a ninth polarization state of the fifth pulse sequence is same as a tenth polarization state of the sixth local oscillator light, and an eleventh polarization state of the sixth pulse sequence is same as a twelfth polarization state of the seventh local oscillator light;

increase a first phase of the fourth local oscillator light by $\pi/2$ and a second phase of the fifth local oscillator light by $\pi/2$, or increase a third phase of the sixth local oscillator light by $\pi/2$ and a fourth phase of the seventh local oscillator light by $\pi/2$;

perform the first homodyne detection on combined light of the fourth pulse sequence and the fourth local oscillator light and on combined light of the fifth pulse sequence and the fifth local oscillator light, to output a first electrical signal;

perform the first homodyne detection on combined light of the sixth pulse sequence and the sixth local oscillator light and on combined light of the seventh pulse sequence and the seventh local oscillator light, to output a second electrical signal;

split the second pulse sequence into an eighth pulse sequence, a ninth pulse sequence, a tenth pulse sequence, and an eleventh pulse sequence, wherein an eleventh intensity is of the eighth pulse sequence, a twelfth intensity is of the ninth pulse sequence, a thirteenth intensity is of the tenth pulse sequence, and a fourteenth intensity is of the eleventh pulse sequence, and the eleventh intensity, the twelfth intensity the thirteenth intensity, and the fourteenth intensity are same; and split the second local oscillator light into an eighth local oscillator light, a ninth local oscillator light, a tenth local oscillator light, and an eleventh local oscillator light, wherein a fifteenth intensity is of the eighth local oscillator light, a sixteenth intensity is of the ninth local oscillator light, a seventeenth intensity is of the tenth local oscillator light, an eighteenth intensity is of the eleventh local oscillator light, and wherein the fifteenth intensity, the sixteenth intensity, the seventeenth intensity, and the eighteenth intensity are same, wherein a thirteenth polarization state of the eighth pulse sequence is same as a fourteenth polarization state of the eighth local oscillator light, a fifteenth polarization state of the ninth pulse sequence is same as a sixteenth polarization state of the ninth local oscillator light, a seventeenth polarization state of the tenth pulse sequence is same as an eighteenth polarization state of the tenth local oscillator light, and a nineteenth polarization state of the eleventh pulse sequence is same as a twentieth polarization state of the eleventh local oscillator light;

increase a fifth phase of the eighth local oscillator light by $\pi/2$ and increase a sixth phase of the ninth local oscillator light by $\pi/2$, or increase a seventh phase of the tenth local oscillator light by $\pi/2$ and increase an eighth phase of the eleventh local oscillator light by $\pi/2$;

perform the second homodyne detection on combined light of the eighth pulse sequence and the ninth local oscillator light and on combined light of the tenth pulse sequence and the eleventh local oscillator light, to output a third electrical signal; and perform the second homodyne detection on combined light of the tenth pulse sequence and the tenth local oscillator light and on combined light of the eleventh pulse sequence and the eleventh local oscillator light, to output a fourth electrical signal.

12. The apparatus according to claim 11, wherein the processor is configured to:
obtain a first sampling sequence of the first pulse sequence according to the first electrical signal and the second electrical signal;
obtain a second sampling sequence of the second pulse sequence according to the third electrical signal and the fourth electrical signal;
obtain a second phase difference and a third phase difference according to the information about the plurality of reference pulses, a third sampling sequence, and a fourth sampling sequence, wherein the third sampling sequence is of reference pulses of the first pulse sequence and the fourth sampling sequence is of reference pulses of the second pulse sequence, wherein the second phase difference is between signal pulses in the first pulse sequence and the first local oscillator light, and the third phase difference is between signal pulses in the second pulse sequence and the first local oscillator light; and
calculate the plurality of regular components of the plurality of signal pulses in the received optical pulse sequence according to the second phase difference, the third phase difference, the first electrical signal, the second electrical signal, the third electrical signal, and the fourth electrical signal.

13. A apparatus, comprising:
a first optical splitter, configured to split a received optical pulse sequence into a first pulse sequence and a second pulse sequence, wherein the first pulse sequence comprises a plurality of reference pulses and a plurality of signal pulses, wherein a first time sequence of the plurality of reference pulses is alternate to a second time sequence of the plurality of signal pulses, and first frequencies of the plurality of reference pulses are same as second frequencies of the plurality of signal pulses, and the signal pulses are quantum signal pulses;
an identifier, configured to detect a first ratio, wherein the first ratio is of a first light intensity to a second light intensity, wherein the first light intensity is of the first pulse sequence and the second light intensity is of the received optical pule sequence;
a generator, configured to generate a first local oscillator light, wherein the first local oscillator light is a third pulse sequence, and a third time sequence of the third pulse sequence is coincident with a fourth time sequence of the received optical pulse sequence;

a second optical splitter, configured to split the first local oscillator light into a second local oscillator light and a third local oscillator light, wherein a first polarization state of the second local oscillator light is same as a second polarization state of the first pulse sequence;

a first detector, configured to perform homodyne detection on the first pulse sequence and the first local oscillator light, to obtain a homodyne detection result; and a processor, configured to obtain a plurality of regular components of the plurality of signal pulses in the received optical pulse sequence according to the homodyne detection result and the first ratio.

14. The apparatus according to claim 13, wherein the identifier comprises a second detector, and the second detector is configured to:

detect the first light intensity of signal pulses in the first pulse sequence and the second light intensity of signal pulses in the received optical pulse sequence, and calculate the first ratio.

* * * * *